United States Patent
Gindele et al.

(10) Patent No.: US 6,741,326 B2
(45) Date of Patent: May 25, 2004

(54) METHODS, APPARATUS, AND SYSTEMS FOR DETECTING PARTIAL-SHADING ENCODEMENT FILTERING

(75) Inventors: Edward B. Gindele, Rochester, NY (US); Joel S. Lawther, Rochester, NY (US); David C. Smart, Fairport, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 10/269,622

(22) Filed: Oct. 11, 2002

(65) Prior Publication Data

US 2004/0071462 A1 Apr. 15, 2004

(51) Int. Cl.[7] .................. G03B 27/32; G03B 27/52; G03B 27/72
(52) U.S. Cl. .................. 355/40; 355/41; 355/68; 355/69; 355/77; 396/568; 396/626; 396/639
(58) Field of Search ................ 355/32–35, 40, 355/41, 67–69, 77; 396/567–570, 626, 639

(56) References Cited

U.S. PATENT DOCUMENTS

| | | |
|---|---|---|
| 2,210,610 A | 8/1940 | White |
| 4,847,680 A | 7/1989 | Okino |
| 4,918,519 A | 4/1990 | Suzuki et al. |
| 5,126,773 A | 6/1992 | Ono et al. |
| 5,189,467 A | 2/1993 | Wheeler |
| 5,486,885 A | 1/1996 | Matsumoto |
| 5,587,752 A | 12/1996 | Petruchik |
| 5,659,357 A | 8/1997 | Miyano |
| 5,696,996 A | 12/1997 | Mintzberg |
| 5,740,479 A | 4/1998 | Soma et al. |
| 5,761,558 A | 6/1998 | Patton et al. |
| 6,173,127 B1 | 1/2001 | Glover et al. |
| 6,311,018 B1 | 10/2001 | Lawther |
| 6,332,059 B1 | 12/2001 | Kanata et al. |

FOREIGN PATENT DOCUMENTS

| | | |
|---|---|---|
| JP | 63-6428 | 1/1988 |
| JP | 2-78935 | 6/1990 |
| JP | 3-94241 | 4/1991 |
| JP | 4328537 | 11/1992 |
| JP | 10-161225 A | 6/1998 |
| JP | 11-242257 A | 9/1999 |
| JP | 2000-162690 | 6/2000 |
| JP | 2000-235211 A | 8/2000 |
| JP | 3109765 | 9/2000 |
| JP | 2001-27773 | 1/2001 |

*Primary Examiner*—D. Rutledge
(74) *Attorney, Agent, or Firm*—Robert Luke Walker

(57) ABSTRACT

In a photography method, a determination is made that a set of captured images includes one or more encoded captured images having a partial shading encodement. The encodement has a predetermined edge pattern and is disposed within a predetermined subarea of an image. An encoded captured image is digitized to provide a digital image having a plurality of pixels. A plurality of pixel templates of an edge pattern and the pixels in the subarea of the digital image are convolved to provide a plurality of template position metrics. Each pixel template has the same shape. Each pixel template is differently located in said subarea. The highest of the template position metrics and a predetermined threshold template position metric value of the edge pattern are compared. The digital image is digitally modified when said highest template position metric matches the threshold template position metric value.

30 Claims, 23 Drawing Sheets

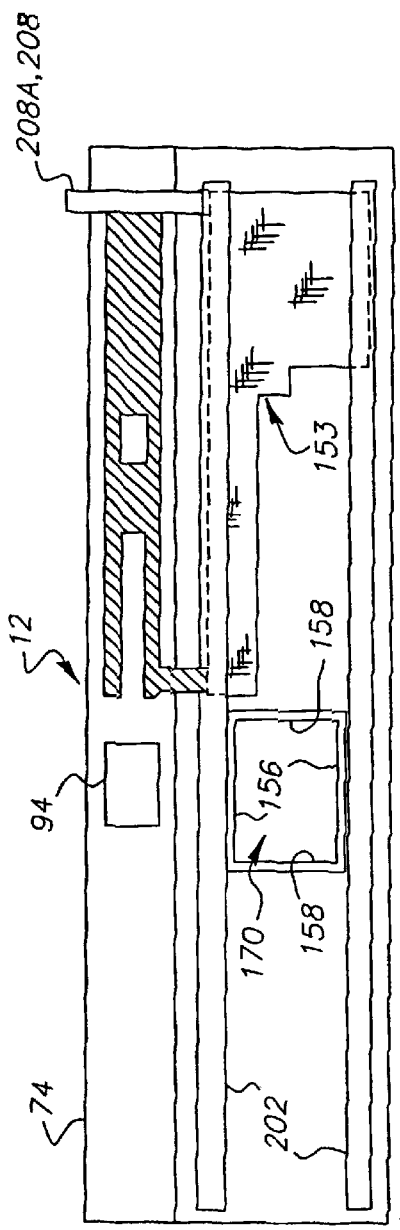
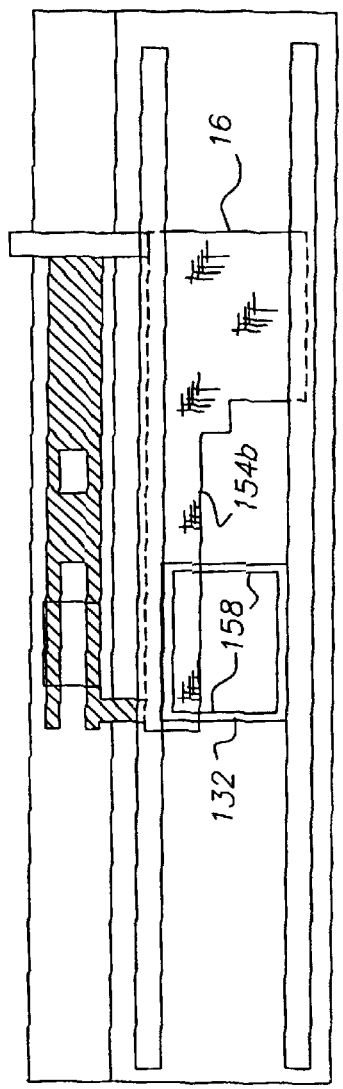
FIG. 11
FIG. 12

METHODS, APPARATUS, AND SYSTEMS FOR DETECTING PARTIAL-SHADING ENCODEMENT FILTERING

CROSS REFERENCE TO RELATED APPLICATIONS

Reference is made to commonly assigned, co-pending U.S. patent application Ser. No. 10/269,598, entitled: PHOTOGRAPHY SYSTEMS AND METHODS UTILIZING FILTER-ENCODED IMAGES, filed Oct. 11, 2002, in the names of Joel S. Lawther, Anthony DiRisio, David C. Smart, Edward B. Gindele; Ser. No. 10/269,715, entitled: CAMERAS, METHODS, AND SYSTEMS WITH PARTIAL-SHADING ENCODEMENTS, filed Oct. 11, 2002 in the names of David C. Smart, Anthony DiRisio, Joel S. Lawther, Robert Luke Walker, Edward B. Gindele, David A. Hodder; Ser. No. 10/269,321, entitled: CAMERA HAVING ROTARY OPTICAL ENCODER, filed Oct. 11, 2002 in the name of David C. Smart, Craig A. Baker; Ser. No. 10/269,322, entitled: CAMERA HAVING TRANSVERSE OPTICAL ENCODER, filed Oct. 11, 2002 in the name of David C. Smart.

FIELD OF THE INVENTION

The invention relates to photography and photographic equipment and methods and more particularly relates to a method for detecting encodement filtering.

BACKGROUND OF THE INVENTION

Optically recorded encodements on photographic filmstrips have long been used to control printing and other functions. U.S. Pat. No. 5,740,479 describes optical encodements and indicates that it is known to use reflected light from the photographic subject or a light directly from a camera light source to provide the illumination for recording the optical encodement. This patent also notes that the use of ambient lighting to write the encodement is subject to the shortcoming that the recorded information can be difficult to distinguish under some lighting conditions.

It is known to prerecord encodements on film before a one-time-use camera is assembled. It is also known to record encodements for selected image frames based upon a camera condition at the time of picture taking. U.S. Pat. No. 6,332,059 combines both practices. A first encodement is prerecorded on the film before assembly and a second encodement is added to selected film frames based on the position of a selection switch. An encodement that applies to all of the images in a film unit can be recorded so as to apply to all frames, rather than being repeated. U.S. Pat. No. 5,761,558 discloses the recording of extensive information on the outside of a film unit in a visible bar code.

Encodements can be placed in various positions. U.S. Pat. No. 6,332,059 discloses placement of optical encodements at film margins adjoining film frames. U.S. Pat. No. 5,587,752 discloses placement of optical encodements laterally next to an image, either within or next to a respective film frame. Japanese patent publication JP 4-328537, published Nov. 17, 1992, discloses a one-time-use camera having a pair of slidable viewfinder masks that move in tandem with a pair of code signal plates for pseudo panoramic and pseudo telephoto final image formats. The code signal plates mask part of the exposure opening when a respective viewfinder mask is in position in the viewfinder. One of the code signal plates is illustrated as having one slot. The other is shown as having two slots. (Image subject matter is visible through the slots.) The final images crop out the pattern made by the code signal plates.

It is also known to record other information within the image area of a filmstrip. U.S. Pat. No. 5,189,467 and U.S. Pat. No. 5,126,773 disclose recording indicia on a mask, which is placed in the film path, and recorded on the image frame at picture taking. U.S. Pat. No. 5,486,885 discloses a similar mechanism that utilizes light from a flash unit in the camera. Japanese patent application 10-161225, published Jun. 19, 1998, discloses a camera that has a dedicated internal light source that shines through a mask to transfer information such as a picture and text onto the image area of a filmstrip. U.S. Pat. No. 2,210,610 discloses a camera that adds different information to each image.

It is well known to use filters in cameras to improve image quality. Japanese Patent No. 3,109,765 discloses that the use of a filter on a one-time-use camera to balance color sensitivity of a film. Japanese patent publication No. 2-78935, published Jun. 18, 1990, discloses a single use camera having a detachable photochromic filter. Japanese patent publication 3-94241, published Apr. 19, 1991, discloses a one-time-use camera having a color correction filter that is switchable to allow use of tungsten balanced film outdoors. Japanese patent publication 63-6428, published Jan. 16, 1988, discloses a one-time-use camera which has a photochromic filter and in which the camera records an unfiltered reference patch to use in determining the state of the filter.

A wide variety of mechanisms are known for moving one or more filters into alignment with and away from a taking lens system. U.S. Pat. No. 6,173,127 teaches a one-time-use camera having a slidable special effects filter. Japanese patent publication JP 11-242257, published Sep. 7, 1999, discloses another camera having a slidable filter. Japanese patent publication JP 2000-235211, published Aug. 29, 2000, discloses a camera having a rotary filter wheel. Japanese patent publications JP 2000-162690, published May 16, 2000, and JP 2001-27773, published Jan. 30, 2001, disclose cameras having a filter wheel offset from the optical axis. U.S. Pat. No. 5,696,996 discloses a camera having a transparent film that moves from roller to roller with the photographic film.

In digital photofinishing, processed images on a filmstrip are scanned, digitally processed, and then printed. With some high-speed equipment, the center portion of a filmstrip is continuously scanned at high resolution. Margins are not scanned, or are scanned at a lower resolution using a different scanner. This makes recognition of optical encodements on filmstrip margins cumbersome, at best. Optical encodements placed in the center portion of the filmstrip remove either image area or the interspacing between frames. The former directly degrades image quality. The latter can degrade the recognition of film frame locations; with film types, such as 35 mm, that do not have perforation defined film frames. One solution to loss of image area is provided by U.S. Pat. No. 6,311,018. This patent discloses placement of optical encodements on film frames, followed by digital removal of the encodements, and restoration of the lost areas of the images. This approach is cumbersome and some image information is lost. The lost information is automatically patched over by replicating neighboring subject matter. With some scenes, the resulting image is distractingly degraded from the original scene. For example, an undesirable loss of information is seen with a human subject or complex background overlapped by an encodement.

A number of methods are known for detecting, from an image, the color of a light source and correcting for the color of the light source. U.S. Pat. Nos. 4,847,680; 4,918,519; 5,659,357 are examples.

It would thus be desirable to provide an improved method for detecting an encodement that can be limited to a central area of a filmstrip, such as the image area.

SUMMARY OF THE INVENTION

The invention is defined by the claims. The invention, in broader aspects, provides a photography method, in which a determination is made that a set of captured images includes one or more encoded captured images having a partial shading encodement. The partial shading is partial shadowing or partial filtering or a combination of the two. The encodement has a predetermined edge pattern and is disposed within a predetermined subarea of an image. An encoded captured image is digitized to provide a digital image having a plurality of pixels. A plurality of pixel templates of an edge pattern and the pixels in the subarea of the digital image are convolved to provide a plurality of template position metrics. Each pixel template has the same shape. Each pixel template is differently located in said subarea. The highest of the template position metrics and a predetermined threshold template position metric value of the edge pattern are compared. The digital image is digitally modified with a digital modification preassigned to the partial shading encodement, when said highest template position metric matches the threshold template position metric value.

It is an advantageous effect of the invention to provide an improved method for detecting that an image has been filtered using one of a set of predetermined filters.

BRIEF DESCRIPTION OF THE DRAWINGS

The above-mentioned and other features and objects of this invention and the manner of attaining them will become more apparent and the invention itself will be better understood by reference to the following description of an embodiment of the invention taken in conjunction with the accompanying figures wherein:

FIGS. 11–14 are semi-diagrammatical views of an embodiment of a camera having shaded outline encoding. First and second screeners are shown in a different position in each of FIGS. 11–14.

FIG. 17a is a side view of the screener of the camera of FIG. 15.

FIG. 17b is a side view of the viewfinder mask of the camera of FIG. 15

FIGS. 18 and 19 show two different shading screen positions.

DETAILED DESCRIPTION OF THE INVENTION

In the method and system, scene images are captured with a camera that has a particular filter. The camera can filter all pictures taken or only selected ones. The filter is associated with a particular digital image modification. This is indicated on the camera or otherwise known to the user. The captured images, including at least some that have the filtering, are stored and transferred in media units for photofinishing. The media units are recognized, during photofinishing, as requiring digital image processing that includes the application of digital modifications associated with predetermined filters. The digital image processing is applied and the particular filter used is identified from the appearance of filtered images. The digital modification associated with the particular filter is determined and applied to the filtered images. Unfiltered images are subjected to ordinary digital processing. Resulting final images are supplied by a printer or in some other manner.

The term "media unit" is used herein to refer to media on which image data is or can be stored for archival purposes, with or without media modification. The "media unit" includes archival media and physically associated structures supporting use of the media In a film-type media unit, the archival media is a photographic filmstrip and the images are captured as latent images. The holder or support of a film-type film unit can include a spool on which the filmstrip is wound and a canister enclosing the filmstrip and spool. In a digital film unit, images are stored in digital form in a memory card or floppy disk or other magnetic, electronic, optical or other memory device. A media unit can be an associated group of images on a memory device having a plurality of such groups. The cameras used with the archival media unit can be reusable or one-time-use.

The term "one-time use camera" and like terms, are used herein to refer to cameras that are provided to consumers in preloaded form and cannot be reloaded, by the consumer, without extensive camera disassembly, or replacement of parts, or use of special tools, or the like. One-time use film cameras are widely available at this time. Digital one-time use cameras are in limited use at this time. The invention is generally discussed herein in terms of one-time use photographic film cameras.

Figure 1:
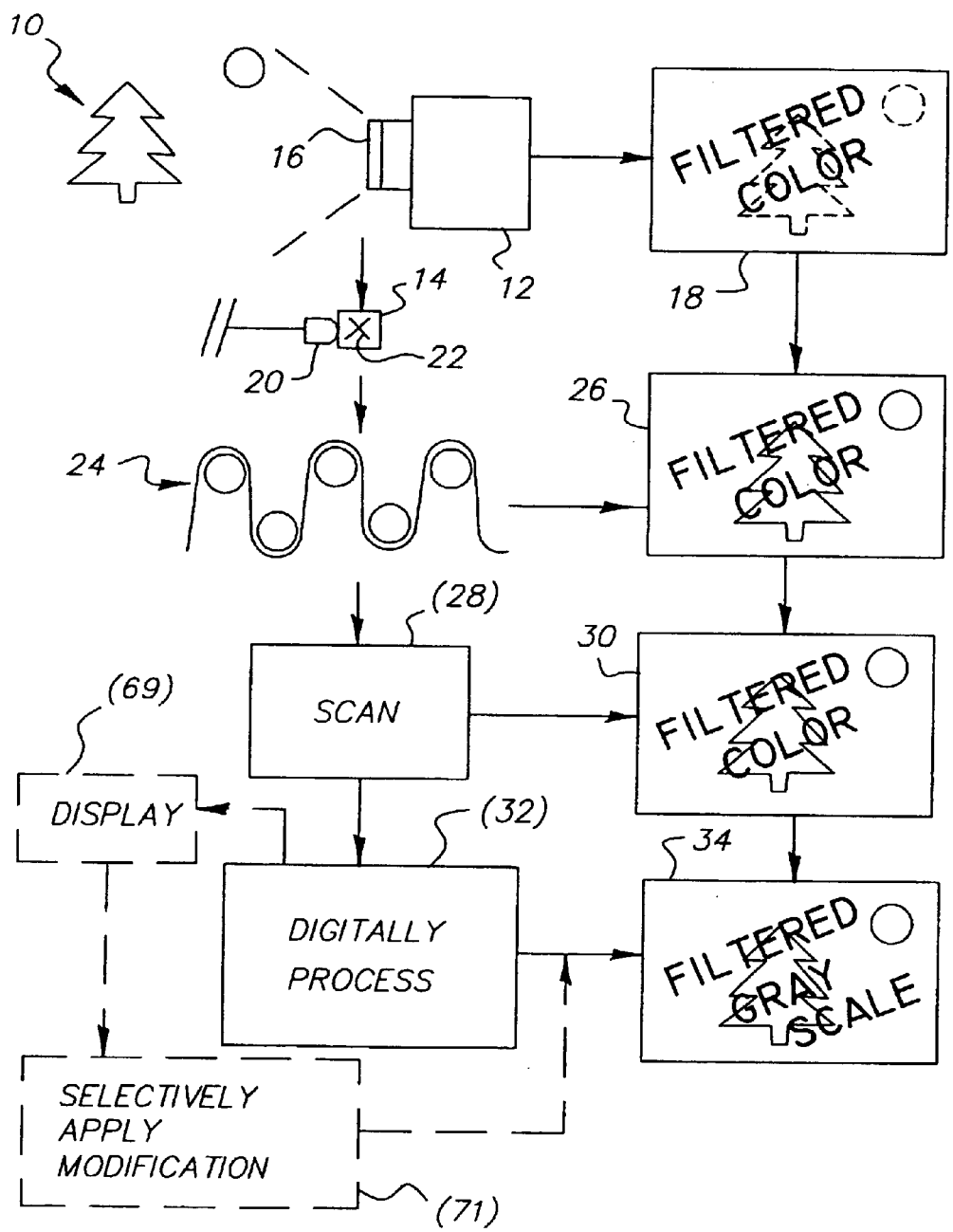
FIG. 1 is a diagrammatical view of an embodiment of the method. Processing is shown for a filter-encoded image.

Referring now to the solid line portion of FIG. 1, a scene image 10 is captured using a camera 12 that has archival capture media and an encodement filter 16 disposed in the optical path to the archival media. (In FIG. 1, the archival media is color photographic film in a film unit 14.) An archival image produced by capture of the light image 10 is filtered, that is, subject to the filtering that occurred during capture. In FIG. 1, the archival image is a latent image 18 on color film and the filtering alters the spectrum of light reaching the film. (This is indicated in FIG. 1 by the text "FILTERED COLOR" on latent image 18.) The term "color cast" is used herein to refer to the effect of this altered spectrum on an image or part of an image. The color cast is, within system limitations, the complement of the color of the filter 16.

After picture taking is completed, the film unit 14 is submitted for photofinishing. A detector 20 reads an indicator 22 (illustrated in FIG. 1 by an "X") on the film unit 14 and sends a detection signal to a digital fulfillment engine 23 (shown in FIG. 4), includes a programmable computer or the like. The detection signal identifies the indicator 22. The indicator is provided in a manner that can be easily detected. The type of detector 20 and indicator 22 used is not critical.

The indicator can be provided in machine-readable form or as human readable indicia or both. The indicator can be located at different places in the film unit 14, such as the canister or holder or on the filmstrip. For example, the indicator can be an optical bar code on the holder or filmstrip and the detector can be a bar code reader. Likewise, the indicator can be recorded magnetically on a magnetic layer of the filmstrip or optically on the filmstrip margin, or in semiconductor memory (accessible by radio-frequency or direct contact) or can be physical discontinuity such as a shaped notch in the filmstrip or one or more of the layers of the filmstrip. With 35 mm (Type 135 film) a convenient location for the indicator is on the filmstrip, since conventional processing separates the filmstrip from the canister, during an initial step.

The indicator only has to convey the information that one or more archival images in the media unit may be filter encoded. Additional information can also be conveyed by the indicator, if desired. Examples of such additional information are an identification number, film type, and the types of available image modifications.

The indicator can be recorded once in the film unit, or can be repeated. For example, the indicator can be recorded in physical association with each film frame or group of film frames. Each repeat of the indicator is the same, or varies in a manner unrelated to the designation of which archival images are to receive a particular digital modification.

The film unit 14 is subjected to chemical processing in a chemical processor 24, rendering the latent image 18 visible as film image 26. The type of chemical processing is not critical and is inclusive of "instant" processing and the like, which utilize materials contained within the film unit 14. The visible image 26 remains filtered, that is, subject to the filter effect of the filtering during capture. The visible image 26 is then scanned (28). The resulting electronic image 30 corresponds to the visible image 26 and retains the filtering.

The term "filter" and like terms are used herein in an ordinary sense and are not inclusive of opaque panels that block light transmission through one or more portions of an optical path. Filters can be optical or digital. The term "filter effect" is thus inclusive of what is sometimes referred to as "corresponding filter effect" or "corresponding digital filter effect". In the embodiments illustrated herein, the filters are colored and the detectable characteristics are changes in color properties. This is currently preferred, because non-color information is held invariant and thus is not lost during filtering. On the other hand, filters with changes in other characteristics can be used. For example, a star filter (not separately illustrated) can be used.

The electronic image 30 is digitally processed (32), in which the digital image is subject to the normal ("representational") digital processing applied during digital photofinishing of film images, such as edge enhancement and calibration for output devices.

Photographic images are generally treated herein as being realistic images of the subject photographed and having the same information content as latent images, as developed images, and as electronic images. The term "representational" and like terms are also used herein to refer to such realistic images and procedures used to produce such images. It will be understood that this is a simplification provided as a matter of convenience for explanatory purposes and that images will differ during processing in manners well known to those of skill in the art. For example, the images are subject to the limitations of the imaging system and the media. Film images are subject to limitations such as grain size. Digital images are necessarily pixelated and commonly have color values partially extrapolated from neighboring pixels. Digital images may also be subject to enhancement modification between capture and storage, for example, to extrapolate values for pixels degraded by sensor defects. Latent images on film are subject to the chemical and physical effects of processing. Images are often stored in a non-realistic form that requires modification to render the images viewable. For example, photographic print film stores images as negatives. Digital images must be displayed or printed and may require other modification, such as decryption or modification for a particular display device. Captured images may also be subject to deliberate modification by the user at the time of capture. For example, an image may be modified by use of a second filter added to the encodement filter.

The digital fulfillment engine 23, responsive to the detection signal, accesses a look-up table (not separately illustrated). In the look up table, a predetermined digital modification is associated with a detectable characteristic that identifies an electronic image as filtered by the respective encodement filter 16. The digital fulfillment engine 23 assesses the electronic image 30 for the presence of the detectable characteristic. Upon detection of the detectable characteristic, the associated digital modification is applied to the electronic image. In FIG. 1, the digital modification is conversion of the color electronic image 30 to a monochrome gray scale modified image 34. (Indicated, in FIG. 1, by "FILTERED GRAY SCALE")

The identifier and the corresponding detection signal identify that encodement filtering may be present in archival images of a film unit and photofinishing should take this into account. The identifier may or may not identify a specific digital modification or group of modifications. Even if a particular modification is identified, the detection signal is not used to determine whether that particular digital modification is to be applied to a particular electronic image or group of images. A convenient identifier is a cartridge ID such as a DX code, that is recorded on one or both of a filmstrip and film canister. For example, a DX code or other cartridge ID can indicate the presence of encodement filtering within a designation of film type. The DX or other identifier can be provided on the filmstrip in any of the manners disclosed in the prior art. For example, the identifier can be positioned in the image area and dealt with as disclosed in U.S. Pat. No. 6,311,018.

Examples of digital modifications include: monochrome, such as black-and-white and sepia; zoom and crop; changing to predefined aspect ratios; intentional distortion; solid color fill as in comic book pictures; soft focus effects; contrast exaggeration or reduction; change in image size for output to different media; photomontage using predetermined outlays. The digital modification can be limited to adding particular metadata (non-pixel information) to an electronic image. This can be used to provide downstream fulfillment such as delivery over a network to predetermined addresses. The digital modification can require operator intervention for fulfillment. For example, metadata included with a particular image could require an operator to supply a promotional item, with a particular final image.

Figures 2, 3:
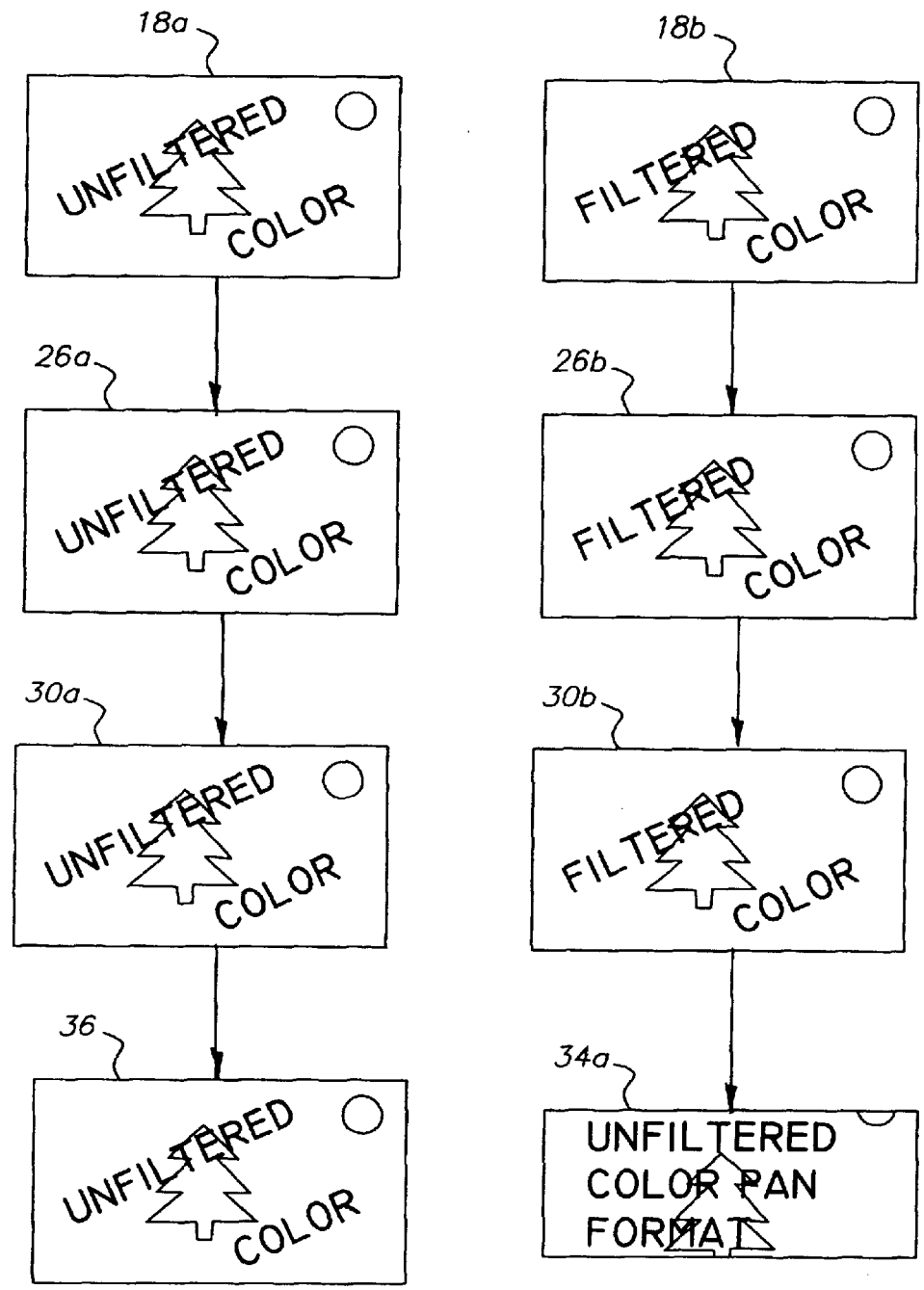
FIG. 2 is a diagrammatical view of the processing of an unfiltered image, by the method of FIG. 1.
FIG. 3 is a diagrammatical view of the processing of a filter-encoded image using a modification of the method of FIG. 1.

FIG. 2 illustrates the processing stages for an unfiltered color image by the method of FIG. 1. The latent image 18a, and the corresponding visible image 26a and electronic image 30a lack the detectable characteristic of a filter encodement and therefore a final digitally processed image 36 remains unmodified following digital processing. (Indicated in FIG. 2 by the text "UNFILTERED COLOR")

FIG. 3 shows a modification of the method in which a different filter 16 and corresponding different modification are used. The image is captured, chemically processed from a latent image 18b to a visible image 26b, and the visible image is scanned to provide the electronic image 30b. Up to this point the respective images remain filtered and in color. (Indicated by the text "FILTERED COLOR") The filtering is detected and the modification is applied: the color image is retained in color, but the modified final image 34a has been changed to a pseudo panoramic format and the detectable characteristic of the filtering has been removed. (Indicated by the text "UNFILTERED COLOR PAN FORMAT") Within practical limits, the removal of the detectable characteristic of the filtering restores the final image to an unfiltered state.

The photofinishing unit 38 makes prints or other final images from archival images recorded in successive film frames of a filmstrip 40. The photofinishing unit 38 herein is described generally in terms of a digital printer that includes both a chemical processor 24 and a digital fulfillment engine 23. Because the features of a digital printer are generally known, the description which follows is directed in particular only to those elements forming part of or cooperating directly with the disclosed embodiment It is to be understood, however, that other elements may take various forms known to a person of ordinary skill in the art. The final images can also take other forms, such as digital images on storage media, such as a compact disc, or digital images transmitted through a network to a computer memory unit. The digital fulfillment engine 23 is inclusive of devices producing such final images from electronic images. The digital fulfillment engine can be part of the digital printer disclosed in U.S. Pat. No. 5,767,945, issued Jun. 16, 1998, which is hereby incorporated by reference in this application.

Figure 4:
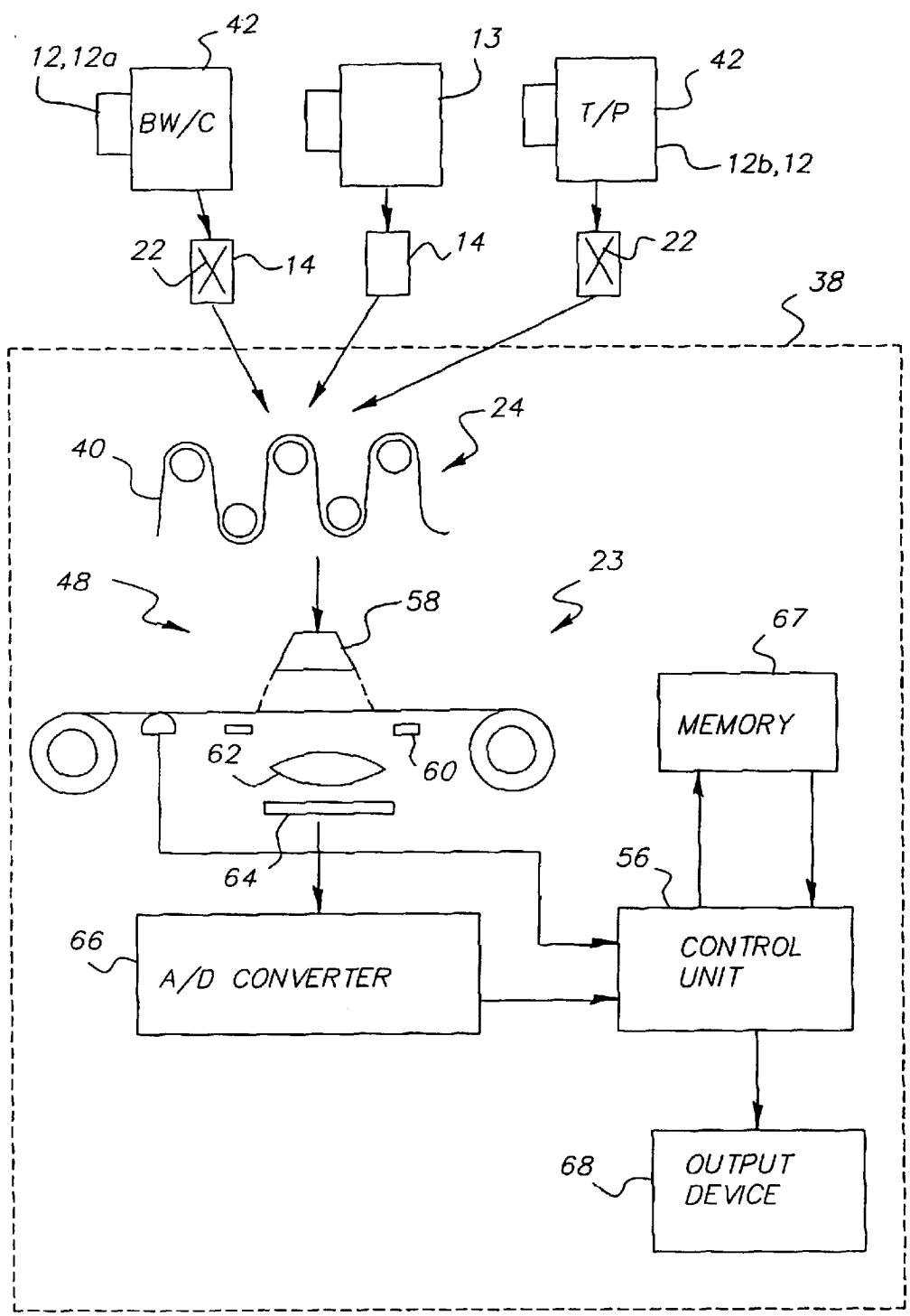
FIG. 4 is a diagrammatical view of an embodiment of the photography system.

FIG. 4 schematically depicts a photofinishing unit 38 having a chemical processor 24 and a digital fulfillment engine 23 used to make respective prints of recorded images within successive film frames of processed filmstrips having filter encodements. The film units 14 are unsorted before reaching the photofinishing unit 38. The film units 14 come from one-time-use cameras. Two of the cameras 12 provide filter encoding. One camera 12a has the human-readable designation 42: "BW/C" (designating black-and-white/color). The other camera 12b has the designation 42: "T/P" (designating telephoto/pseudo panoramic). The third camera 13 does not provide filter encoding and has no designation. The film units 14 from cameras 12a and 12b each bear an indicator 22("represented in FIG. 4 by "X").

Figure 8:
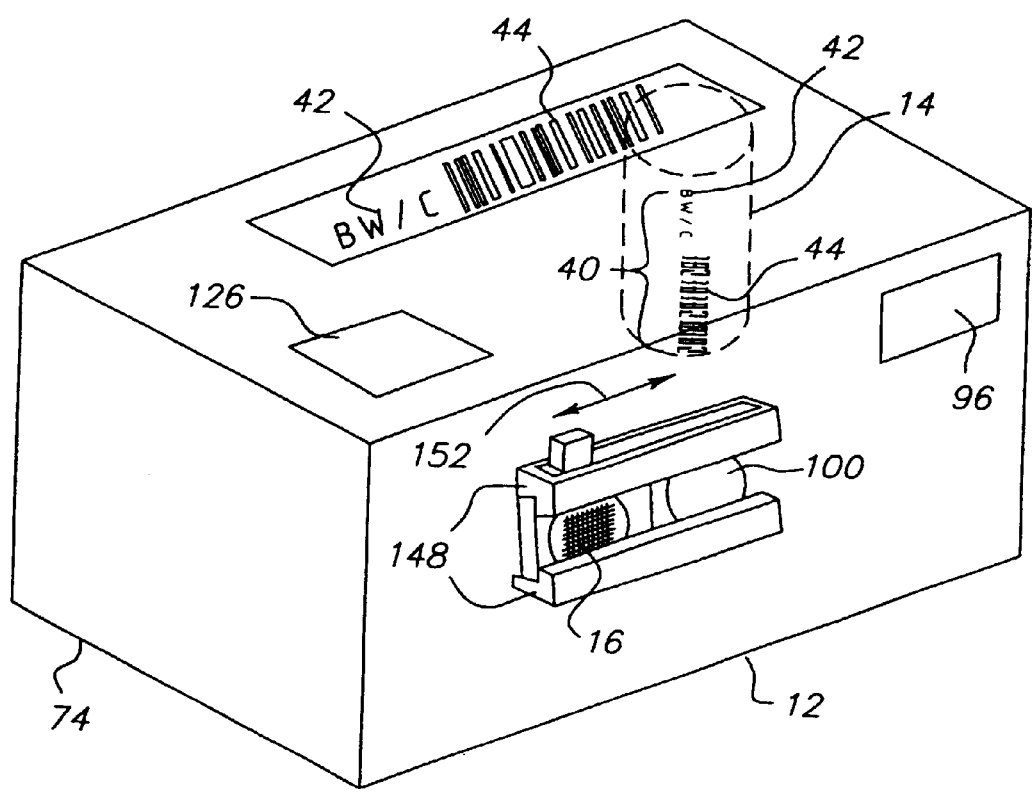
FIG. 8 is a perspective view of a camera having a switchable encodement filter.

In FIG. 8, the one-time-use camera 12 bears the human-readable designation 42, "BW/C", in combination with a machine-readable bar code 44. A film cartridge (also shown in FIG. 8) within the camera can repeat the same designation and bar code. The designation informs the user of the type of digital modification that can be filtered encoded. The bar code can carry the same information. The presence of the indicator on the film unit can also be conveyed by the bar code.

As an alternative to having an indicator 22, film units 14 can be presorted before reaching the photofinishing unit 38. In this case, all film units 14 reaching the photofinishing unit 38 are presumed to have filter encodements. This can be achieved by a manual sort using one or more human readable designations 42 that correspond to the presence of an indicator 22 on the respective film units 14. For example, a manual sort could categorized cameras 12a and 12b as having indicators 22, based on the presence of designations 42 and could categorize cameras 13 as lacking a designation 42 and indicator 22. An automated sort can be provided in the same manner using a machine readable designation 42 or indicator 22 and sorting equipment having a detector and control apparatus (not illustrated) for sorting to different routes responsive to detection of the presence or absence of indicators.

Different indicators 22 can be provided to differentiate digital modifications available on different digital fulfillment engines 23. Sorting, in this case, relies upon a list (not shown) of modifications available with a particular the digital fulfillment engine 23. With manual sorting, the list can be as simple as a printed table on a sheet of paper, against which indicators 22 on the outside of film units 14 are checked. With automated sorting, the indicators are detected and compared to a list that can take the form of a look-up table in local or remote memory, or the like. Film units 14 lacking an indicator or having an indicator not on the list are sorted for conventional processing or some other alternative processing based upon some other parameter.

Film units 14 can also be processed without sorting or detection of an indicator 22 by limiting entry to film units 14 having filter-encoding. For example, a unique film type could be used that would require specialized processing. Alternatively, conventional and filter encoded film units can be processed together as if all were filter-encoded. This approach has the burden of unnecessarily increasing digital processing time for conventional film units and the additional burden of any measures undertaken to remediate improper processing of conventional film units 14 having the same filter effects that are used for filter-encoding.

Referring again to FIG. 4, a particular digital fulfillment engine 23 includes a motorized film drive (not shown) for advancing the filmstrip from a film supply reel 46, through a digital scanner 48 and onto a film take-up reel 50. In this case, filmstrips 40 from many film units are spliced together into a continuous web on the film supply reel 46. Some of the filmstrips 40 are filter encoded; others are not. Each filter encoded filmstrip 40 has one or more indicators 22 (not shown). A data reader 20 (shown in FIG. 1), such as a bar code reader, is positioned to read the indicators 22. The data reader 20 signals detected indicators 22 to the control unit 56. The scanner 48 has a projection light source 58 that shines light through each film frame when the film frame is momentarily positioned at a frame gate 60, and a focusing lens 62 focuses a light-projected image of the archival image on a scanning image sensor 64 such as a charge coupled device (CCD). The resultant analog electronic image provided by the image sensor 64 is converted into digital form and amplified as necessary by an analog to digital ("A/D") converter 66 and sent to the control unit 56. For convenience, the scanner 48 and A/D converter 66 are sometimes referred to collectively herein as a "digitizer" and the procedures provided by those components is referred to as "digitizing". The terms "digitizer" and "digitizing" are also inclusive of other equipment that provide like functions. For example, the digitizer can consist of some of the components of a kiosk.

The control unit 56 is a programmable computer or the like, which processes the images to detect effects of a predetermined list of encodement filters 16 using a look-up table or the like stored locally or remotely in memory 67. The look-up table also stores digital modifications in association with respective filter effects. When a filter effect is detected in an image, a correlation is made to the associated modification and the representational digital image is modified to produce a modified image. The modified image is output to an output device 68, such as a hard copy print maker or other equipment to provide a final image.

Known procedures for detecting a color cast or other filter effect in a digital image are suitable for detecting the color cast produced by an encodement filter 16. A simple example of such a procedure is illustrated in FIG. 1 in both solid and dashed lines. A filmstrip 40 is scanned, digitized, and subjected to the standard digital processing that is used in a particular photofinishing unit 38 for all images. For example, this may include correction of colors for the particular scanner 48 used. The images are then presented (69) one by one on a display. An operator reviews the images and detects when an image exhibits one of a set of predetermined filter effects. The operator then actuates (71) a digital modification assigned to that particular filter effect using a control button or the like. This approach has the advantage of being relatively simple and flexible, but the disadvantages of being relatively slow and subject to operator error.

An automated approach is illustrated by the solid line portion of FIG. 1. This procedure is implemented within a central processing unit of the control unit, which is programmed by software providing the below described algorithms. The central processing unit acts on a digital image that has been scanned, digitized, and subjected to standard processing, as earlier described.

The software can be provided on any computer readable storage medium. Such a computer readable storage medium may comprise, for example; magnetic storage media such as a magnetic disk (such as a floppy disk) or magnetic tape; optical storage media such as an optical disc, optical tape, or machine-readable bar code; solid-state electronic storage devices such as read-only memory (ROM), or random access memory (RAM); or any other physical device or medium employed to store a computer program.

The control unit can be part of a general-purpose computer system or can be a dedicated part of photofinishing equipment. In the latter case, the central processing unit can be part of a control system sometimes referred to as an image data manager (IDM). The computer system or IDM includes memory and can include a display and user controls allowing for supervision and intervention by an operator.

This method for the detection of the use of a color encodement filter 16 relies on a priori knowledge of the color position characteristic of that encodement filter 16 and the color position of a color-neutral object photographed with daylight illumination and without the use of the selected encodement filter 16. Two color positions, i.e. the brightest and average color positions, are calculated directly from the pixels of digital image being analyzed. The two calculated color positions are each compared individually to the two a priori color positions. Specifically, the Euclidian distance in chrominance space is calculated as a figure of merit to determine the likelihood that the selected encodement filer was used to photographic the scene from which the digital image was derived. Therefore, an important aspect of the present invention is the calculation of a predictive color position based on the image pixel information, the calculation of the a distance metric of the calculated predictive color position relative to an a priori color position characteristic of a particular encodement filter 16, and the employment of the distance metric to indicate the likelihood that the particular encodement filter 16 was used to generate the image pixel information.

Each digital image in the set of digital images derived from the original latent images recorded on the film strip is analyzed to determine if the selected encodement filter 16 had been used to record the corresponding original image. The placement of the selected encodement filter 16 in front of the archival media of the camera 12 has the effect of inducing an overall color cast to the resultant image formed on the photographic film. Consequently, the corresponding digital image will also have a characteristic overall color cast. That is, all the pixels of the digital image will be similarly affected.

Typically the image pixel data of the digital image is received in a red, green, blue representation. While an overall color cast of a digital image can be detected directly by analyzing the image pixel data in a red, green, blue representation, the present procedure transforms the image pixel data into a luminance-chrominance representation (LCC) to facilitate the detection process. Let the variables $R_{ij}$, $G_{ij}$, and $B_{ij}$ refer to the pixel values corresponding to the red, green, and blue digital image pixels located at the $i^{th}$ row and $j^{th}$ column. Let the variables $L_{ij}$, $GM_{ij}$, and $ILL_{ij}$ refer to the transformed luminance, first chrominance, and second chrominance pixel values respectively of a luminance-chrominance representation digital image. The 3 by 3 elements of the matrix transformation are described by expression (1).

$$L_{ij}=0.333R_{ij}+0.333G_{ij}+0.333B_{ij} \quad (1)$$

$$GM_{ij}=-0.25R_{ij}+-0.50G_{ij}-0.25B_{ij}$$

$$ILL_{ij}=-0.50R_{ij}+0.50B_{ij}$$

Those skilled in the art will recognize that the exact values used for coefficients in the luminance/chrominance matrix transformation may be altered and still yield substantially the same effect. An alternative can also be used as described by expression (2).

$$L_{ij}=0.375R_{ij}+0.500G_{ij}+0.125B_{ij} \quad (2)$$

$$GM_{ij}=-0.250R_{ij}+0.500G_{ij}-0.250B_{ij}$$

$$ILL_{ij}=-0.500R_{ij}+0.50B_{ij}$$

The two chrominance pixel values $GM_{ij}$ and $ILL_{ij}$ represent the color position coordinates of the $ij^{th}$ pixel.

Figure 34:
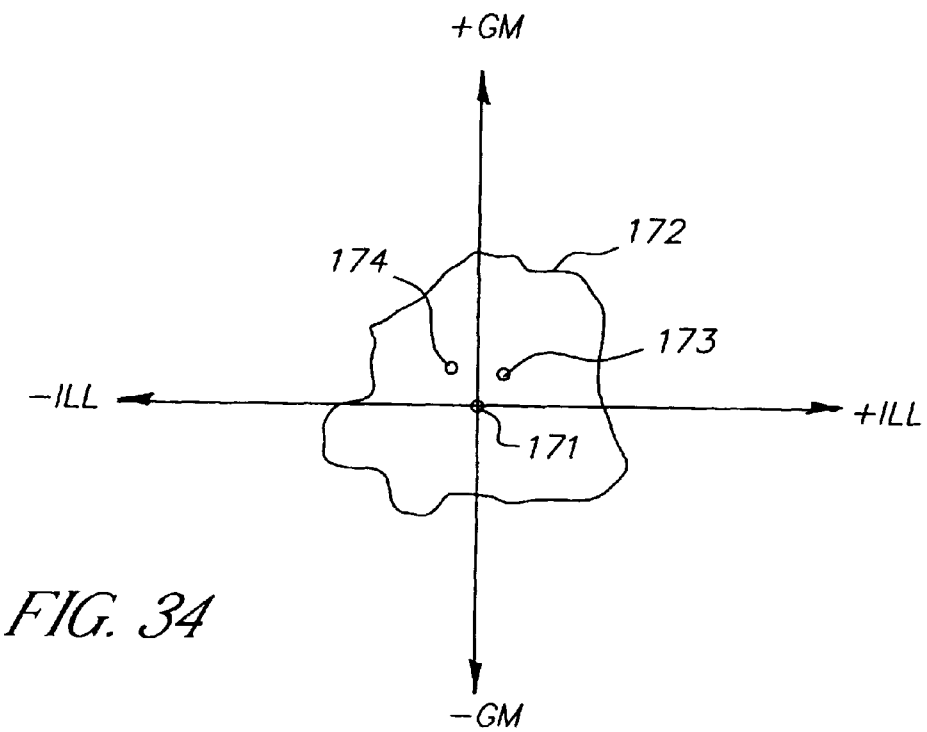
FIG. 34 is a plot depicting chrominance space for chrominance pixel data photographed without the use of an encodement filter. The pixel data represents an arbitrary natural scene.

Most photographed natural scenes exhibit a range of colors but have a distribution of chrominance pixel values that vary about a center color position that is determined by the color of the source illumination. Referring to FIG. 34, an example plot of chrominance space is shown with the center of the two axes indicated by point 171 corresponding to the color position of a color-neutral object, such as a gray card, photographed with daylight illumination. The region indicated by contour 172 depicts the range of chrominance pixel values for a typical digital image photographed with daylight illumination. The numerical average, or center, of the chrominance pixel values is indicated by point 173, i.e. the average color position. As can been seen by the plot depicted in FIG. 34, the average color position lies within the range of chrominance pixel values and is close to the color position of a color-neutral object photographed with daylight illumination indicated by point 171. Also shown in FIG. 34 is point 174, the brightest color position, i.e. the color position of the pixels with the highest, or brightest, corresponding luminance values. In general, the brightest color position is a good indication of the color of the illumination source. Photographed materials that have a correspondingly high reflection coefficient result in bright luminance pixel values. Such materials are often color-neutral materials, e.g. white shirts, white paper, etc. and therefore indicate the color of the source illumination.

Figure 35:
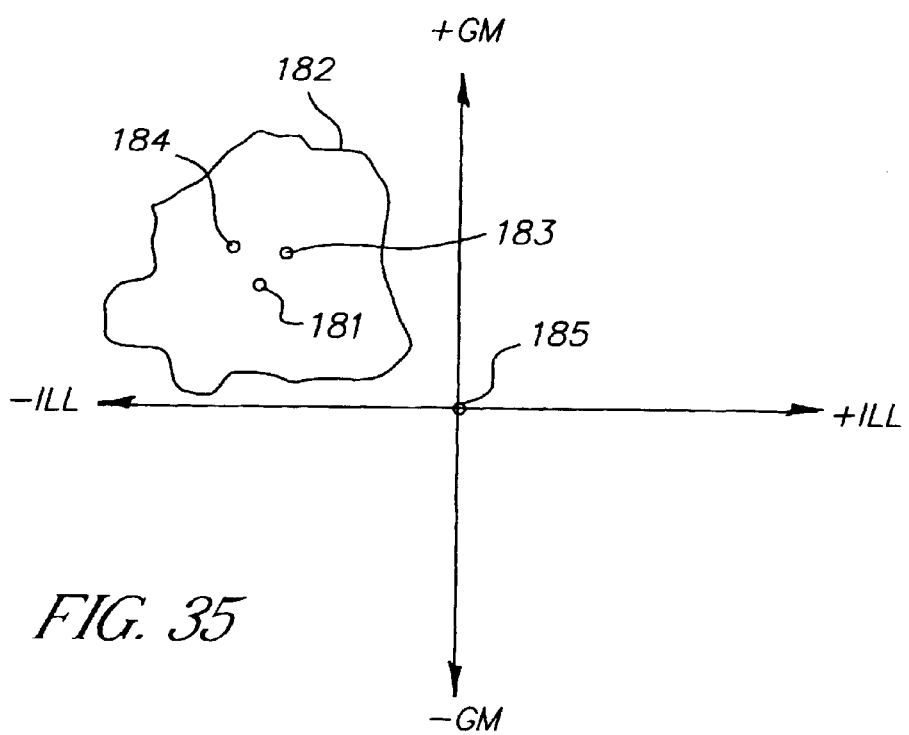
FIG. 35 is a plot depicting chrominance space for chrominance pixel data, for the same scene as in FIG. 34, photographed with a selected color encodement filter.

When the same scene is photographed with the selected encodement filer in place, the resulting chrominance pixel values are shifted in chrominance space. FIG. 35 shows an example plot of shifted chrominance pixel values for such an example. The color position of a color-neutral object photographed with daylight illumination and the selected encodement filter 16 is shown by point 181 and is shifted in chrominance space to a position that is characteristic of the selected encodement filter 16 called the color filer color position. The region indicated by contour 182 depicts the range of chrominance pixel values also shifted in chrominance space by the characteristic of the selected encodement filter 16. The average color position, indicated by point 183 is also shifted in chrominance in accordance with the characteristic color of the selected encodement filter 16. Similarly, the brightest color position is shifted in chrominance space (as indicated by point 184).

Those skilled in the art will appreciate that both the average color position and the brightest color position can indicate the use of the selected encodement filter 16. That is, when either the average color position or the brightest color position indicate a color position that is near the encodement filter color position characteristic of the selected encodement filter 16 in use, it can be assumed that the selected encodement filter 16 has been used. It should also be noted that the present procedure can be practiced with color filters of a variety of different colors since the detection of the use of the selected encodement filter 16 is based on the characteristic color position being known a priori and being different from the color position expected for scenes illuminated with a daylight illumination source (the daylight color position as indicated by point 185 in FIG. 35).

The average color position is calculated ($GM_{ave}$, $ILL_{ave}$) using the expression (3)

$$GM_{ave}=(1/N)\Sigma_{ij}GM_{ij} \quad (3)$$

$$ILL_{ave}=(1/N)\Sigma_{ij}ILL_{ij}$$

where the variable N represents the number of pixels in the digital image. The brightest color position is calculated ($GM_{br}$, $ILL_{br}$) by first calculating a cumulative histogram of the luminance pixel values. The cumulative histogram is used to identify the brightest pixels. Only the pixels that have a corresponding luminance pixel value that ranks in the brightest 10 percent of pixels are used in the calculation of the brightest color position as indicated in expression (4)

$$GM_{br}=(1/M)\Sigma_{ij}GM_{ij}w_{ij} \quad (4)$$

$$ILL_{br}=(1/M)\Sigma_{ij}ILL_{ij}w_{ij}$$

where the variable M represents the number of pixels corresponding to 10 percent of the total number of pixels and the variable $w_{ij}$ represents a weighting factor equal to 1.0 for pixels with corresponding luminance pixel value that ranks in the brightest 10 percent of pixels and 0.0 of the other pixels.

Figure 36:
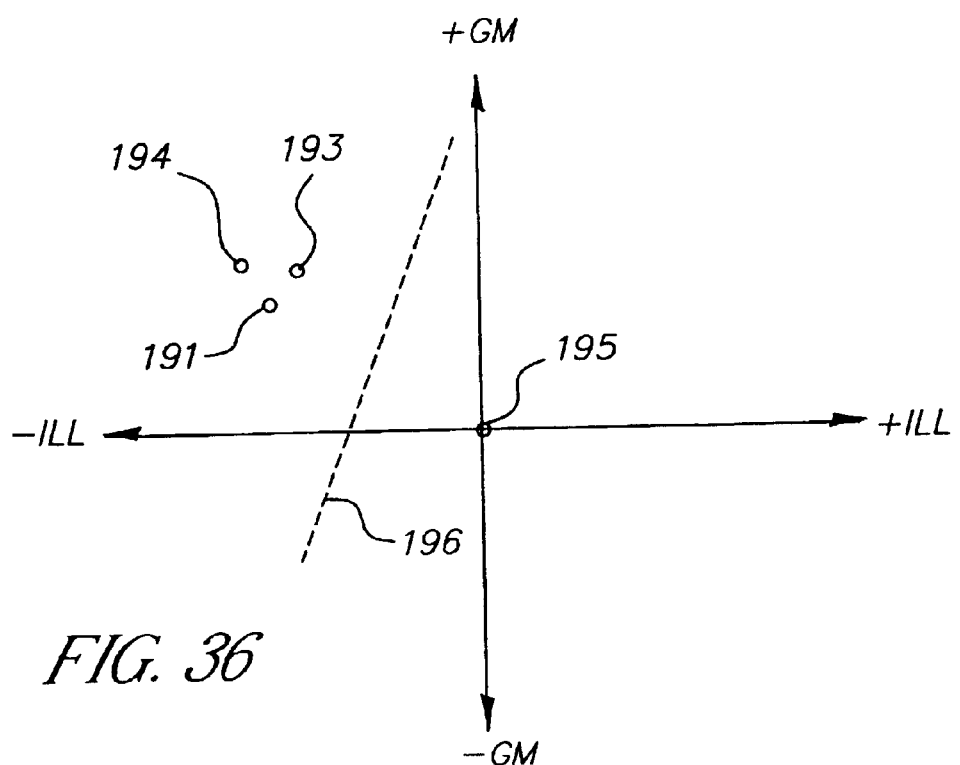
FIG. 36 is a plot depicting chrominance space illustrating calculated color positions for the color encodement filter of FIG. 35.

FIG. 36 shows the color positions for calculated values corresponding when using a selected encodement filter 16. The average color position and the brightest color position, indicated as points 193 and 194 respectively, are used to predict the use of the selected encodement filter 16. Point 191 indicates the color filter color position. First a distance parameter is calculated for both the average and brightest color positions relative to the color filter 16 and daylight color positions. The distance ($D_{ave-day}$) from the average color position ($GM_{ave}$, $ILL_{ave}$) to the daylight color position ($GM_{day}$, $ILL_{day}$) is given by expression (5).

$$D_{ave-day} = \sqrt{(GM_{ave} - GM_{day})^2 + (ILL_{ave} - ILL_{day})^2} \quad (5)$$

The distance ($D_{ave-cf}$) from the average color position ($GM_{ave}$, $ILL_{ave}$) to the color filter color position ($GM_{cf}$, $ILL_{cf}$) is given by expression (6).

$$D_{ave-cf} = \sqrt{(GM_{ave} - GM_{cf})^2 + (ILL_{ave} - ILL_{cf})^2} \quad (6)$$

Similarly, the distance ($D_{bre-day}$) from the brightest color position ($GM_{br}$, $ILL_{br}$) to the daylight color position ($GM_{day}$, $ILL_{day}$) is given by expression (7).

$$D_{br-day} = \sqrt{(GM_{br} - GM_{day})^2 + (ILL_{br} - ILL_{day})^2} \quad (7)$$

The distance ($D_{br-cf}$) from the brightest color position ($GM_{br}$, $ILL_{br}$) to the color filter color position ($GM_{cf}$, $ILL_{cf}$) is given by expression (8).

$$D_{br-cf} = \sqrt{(GM_{br} - GM_{cf})^2 + (ILL_{br} - ILL_{cf})^2} \quad (8)$$

When the distance from the average color position to the color filter color position ($D_{ave-cf}$) is less than the distance from the average color position to the daylight color position ($D_{ave-dey}$), the likelihood the selected encodement filter 16 having been used is high. Similarly, when the distance from the brightest color position to the color filter color position ($D_{br-cf}$) is less than the distance from the brightest color position to the daylight color position ($D_{br-day}$), the likelihood the selected encodement filter 16 having been used is also high. When $D_{br-cf} < D_{br-day}$ and $D_{ave-cf} < D_{ave-day}$, the likelihood the selected encodement filter 16 having been used is even higher. Also shown in FIG. 36 is line 196, which divides chrominance space into two domains. When the average and brightest color positions are in the domain that contains the daylight color position (indicated as point 195), the determination is made that it is unlikely that the selected encodement filter 16 had been used. Conversely, when the average and brightest color positions are in the domain that contains the filter color position (indicated as point 194), the determination is made that it is likely that the selected encodement filter 16 had been used.

While the above discussion employs a direct comparison between the calculated distance parameters, e.g. $D_{ave-cf}$ and $D_{ave-day}$, it is also possible to use a prorated comparison. For example, the likelihood of the selected encodement filter 16 having been used can be calculated using the expression $D_{ave-cf} < 1.5 D_{ave-day}$. The multiplicative factor can be used to optimize the detection of the use the encodement filter 16. A database of images captured with and without using the encodement filter is collected. The above-described method of detection is applied to the digital image derived from the captured images. Since the truth data as to the use of the encodement filter is known, the multiplicative factor can be adjusted to optimize the number of correctly indicated detections versus incorrectly indicated detections.

As an alternative procedure, average color position can be used without the brightest color position to indicate the use of the selected encodement filter 16. The brightest chrominance position can also be used without using the average color position. It is expected that the more saturated the characteristic color of the selected encodement filter 16 the better the detection results will be.

A predictive chrominance parameter is said to match a reference chrominance parameter when it is within a predetermined numerical range of the reference chrominance parameter in the luminance-chrominance representation.

The color filter color position ($GM_{cf}$, $ILL_{br}$) is an example of a reference chrominance parameter. The average color position is calculated ($GM_{ave}$, $ILL_{ave}$) and brightest color position ($GM_{br}$, $ILL_{br}$) are examples of predictive chrominance parameters. This range is a function of inaccuracies in the system, differences between the encodement filters used in the cameras and the reference values, and differences in films and film processing. A smaller range is less likely to suffer errors, but is likely to increase costs. A suitable range for a particular embodiment can be readily determined by trial and error.

It should also be noted that the calculation of a predictive chrominance parameter can be performed with the image pixel data in a red-green-blue representation. For example, each individual color of pixels in the digital image can be averaged to produce the quantities $R_{ave}$, $G_{ave}$, and $B_{ave}$. Similarly, the color filter color position can be determined with equivalent quantities $R_{cf}$, $G_{cf}$, and $B_{cf}$. The quantities $R_{ave}$, $G_{ave}$, and $B_{ave}$ can then be used to calculate the quantities $GM_{ave}$, $ILL_{ave}$ and the quantities $R_{cf}$, $G_{cf}$, and $B_{cf}$ can then be used to calculate the quantities $GM_{cf}$, $ILL_{cf}$.

In an alternative procedure, each pixel is examined independently. This approach has the advantage of avoiding errors arising from a consideration of an overall image parameter, such as color. Any algorithm intended to discriminate between the use and non-use of the encodement filter 16 by an overall image parameter, can erroneously conclude that a photograph of a scene that is itself mostly the color of the filter was made through the filter when in fact it was not; or, can erroneously conclude that a photograph of a scene that is predominately the complementary color to the filter 16 was made without the filter when in fact the filter was in place. By examining each pixel independently, errors of this type can be avoided.

If a scene is captured with filter 16 in place, only system noise will cause individual pixels to be close to the complimentary color of the filter. Examining each pixel, the algorithm can count each instance when that pixel's color position relative to a reference color position for the color cast exceeds a predetermined threshold value. The threshold value takes into account, filter irregularities, noise in processing, and the like. Suitable values can be determined by simple trial and error.

A number of pixels equal to or in excess of a difference criteria indicates that the photograph was not taken with the filter 16 in place. The difference criteria can be a very small number of pixels and, with a large margin for error, less than 25 percent of the total number of pixels in the digital image, or with a smaller margin, less than 10 percent of the total number of pixels. In practice, a sampling of pixels, preferably in a distribution (random or a grid pattern) over the digital image, are compared to the reference color position. The sampling matches the reference color position, that is, the image is considered to have the particular color cast filter effect, when the sampling meets the difference criteria.

The sampling is equal to or larger in number of pixels than the applicable difference criteria. The number and location of pixels in a sampling can be preset and unchanging in each analysis or can change actively. In the latter case, each pixel or a sampling is compared in sequence and analysis is halted when the applicable difference criteria is met.

The pixels can be taken from a limited area of the image. This is required for some embodiments (discussed below) in which filtering is limited to part of the image. Limiting the area analyzed presents an increasing risk, as the area is decreased, that unusually colored scene content could cause erroneous results.

The sampling is of the size of the difference criteria The reference color position is preferably corrected to account for differences between a theoretical value of the color cast and the actual color cast produced in practice. The correction in the reference color position accounts for color changes introduced by film sensitometry, film processing chemistry effects, scanner inaccuracies, and the like.

The reference color position can be predetermined in the form of separate red, green, blue (RGB) reference values. In that case, raw RGB pixel values for the digital image can be individually correlated to corresponding RGB reference values. The RGB pixel values can be supplied directly by an analog to digital conversion of the initial electronic image. The correlating can be performed in a single procedure to optimize the detection algorithm. In that case, the raw RGB values for each pixel of the sampling are compared to limits in a look-up table (LUT). Values in the LUT include the expected limits due to filtration and also the factors required to achieve neutral gray balance for the unfiltered system. That is, for calculation efficiency, the values include a correction for known film sensitometry, film processing chemistry effects on film system sensitometry, and scanner calibration, and the like.

This approach has been described in terms of the use of a single encodement filter. The same approach is applicable to the use of a set of predetermined color encodement filters. In that case, determined color positions are mapped to reference color positions predetermined for the filters of the set to establish whether an encodement filter was used and which one.

Another alternative procedure is suitable for filter-encoded images exposed through a highly saturated yellow, cyan, or magenta filter 16. The filter 16 used is selected so as to match the filter 16 to the spectral characteristics of one of the "color channels" of the camera 12. The term "color channels", used herein, refers to those parts of a camera that limit capture of part of the image to one color of a small set of different colors. With photographic film, different colors are generally captured by different components and/or in different layers. With digital cameras, different colors are captured in a similar manner by different layers or by use of different filters. Usually a pixelated, three-color filter is used over a matching pixellated imager. In that case, each color channel has a unicolored subset of filter pixels.

The highly saturated filter 16 blocks or greatly diminishes a digital primary in the color record of the captured image. For example, the highly saturated yellow, cyan, or magenta filter 16 blocks or greatly diminishes exposure of the complementary blue, red, or green component/color layer of photographic film. Likewise, the highly saturated yellow, cyan, or magenta filter 16 blocks or greatly diminishes exposure through respective yellow, cyan, or magenta filter 16 pixels of a digital camera 12. Detection of the filtering in a digital image is a simple comparison of primary color values. For example, scene color values can be totaled and compared to each other. Analysis in chrominance space is not required in this case. A color record that lacks a digital primary color is unlikely to represent a naturally occurring scene and can, therefore, be presumed to show deliberate use of a filter 16 of the particular color.

Alternatively, the image pixel data of the digital image can be left unaltered and the indication of a desired digital image processing effect to be applied later to the digital image can be encoded as metadata as part of the electronic file that also stores the pixel data. The metadata indicating the desired digital image processing effect can then be read at a later time and an enhanced digital image with the desired digital image processing effect can be selectively generated.

It should be noted that the choice of color position for the encodement filter is important since it is possible for the automatic means described above to falsely identify a natural scene photographed without the encodement filter as having been photographed with the encodement filter. For example, any natural scene that is dominated by a particular color can be confused. A blue dominated scene photographed with a yellow encodement filter would produce image pixel data that would, on average, be close to a color neutral position. Similar arguments can be made for any other chosen color position of the encodement filter since it is possible, however unlikely, to have a natural scene dominated by any color position. Choosing a highly color saturated color position for the encodement filter minimizes the chances that a natural scene photographed with the encodement filter can be confused with a natural scene photographed without an encodement filter.

While the above description relates to determining an overall color cast for a digital image, the same approach can be used to determine the color cast for a portion of a digital image. As is described in more detail below, an encodement filter can be localized to a predetermined region of the digital image. To detect the use of an encodement filter that is localized to a predetermined region, two color positions must be calculated to determine if the encodement filter has been used. A first color position is calculated using the method described above using only the pixels associated with the predetermined region. Thus a determination is made as to whether or not the selected encodement filter was used to for the predetermined region. A second color position is calculated using a center region of pixels centered within the digital image that does not contain any pixels that overlap with a predetermined region associated with one or more of the encodement filters. The second color position is calculated in similar fashion as the first color position to determine if the color cast of the center region of pixels indicates a color cast that is similar to expected color cast when using the selected encodement filter. Since for this embodiment, the encodement filter cannot influence the color cast of the center region, the second color position should not indicate the characteristic color position of the encodement filter. That is, the second color position calculated from the center region of pixels should indicate that the encodement filter was not used, i.e. that the second color position is inconsistent with the encodement filter. A positive determination that the encodement filter was used to photograph the scene is made by a combination of 1) the first color position indicating that the encodement filter was used to produce the color cast of the predetermined region of pixels and 2) the second color position indicating that the color cast of the center region of pixels is inconsistent with the use of the encodement filter.

The particular filters 16 used in the method can also be chosen to provide a benefit to a final image, as with warm filters 16 and monochromatic images. In that case, the effects of the filtering are retained. In many other cases the effects of filtering will not be beneficial for a particular modification. In those situations, the effects of the filtering can be removed and the ease of removal of the effects of filtration is a consideration.

In FIG. 1, the captured images are filtered by a warm filter 16, that is, a filter 16 that limits transmission to light in the red-yellow portion of the visible spectrum. The effects of the warm filter 16 are considered beneficial to the resulting monochromatic images and are therefore retained in final images. With colored images, the filter effects of a filter 16 may be undesirable. In this case the effect can be removed by digital processing. In addition to any losses of information caused by a particular digital processing approach, removal of the visible effects of filtering cannot restore information that was never captured due to the filtering. The filter 16, film, and modification can be selected so as to make the effects of filtering acceptable or even desirable. For example, the effects of use of a warm filter 16 with color film to produce a black-and-white image are generally desirable. On the other hand, image information losses may be unacceptable if black-and-white film is used with the equivalent of a neutral density filter 16. Similarly, a non-color filter 16 could cause unacceptable image degradation for some uses. The use of a color filter 16 to modify part of the color record of an image is relatively limited, since the remainder of the color record remains available.

It is convenient to limit filters 16 intended for digital reversal to narrowly defined characteristics; since it is easier to compensate for the effects of a filter 16 that has well defined characteristics in the digital modification. Similarly, the filter 16 used can be selected so as to minimize loss of image information and/or shift information loss to less noticeable aspects of the image. For example, a dark neutral density filter 16 is generally undesirable, because overall loss of information, including gray scale information, is likely to be high after digital compensation. On the other hand, a low to moderate density colored filter 16, particularly a filter 16 that removes only a narrow portion of the spectrum, retains most gray scale information. Color information is lost, but restoration efforts, even if imperfect, are unlikely to be very noticeable in images intended for general use. If color reproduction is of more concern than grey scale content, then other types of filters 16 may be preferable. If filter 16 choices for particular purposes are not immediately apparent, simple trial and error will lead very quickly to suitable filters 16 for particular purposes.

The encoding filter 16 can be provided as a permanent or temporary part of an optical system in a camera. A permanent filter is convenient for one-time-use cameras intended for a single purpose, but the invention is not limited to such cameras. A selectable filter can be supplied in a one-time use camera or a reusable camera Features are generally described herein in relation to film cameras and photographic film units. Digital cameras and digital storage media can be used instead or in addition to film cameras and film units. Scanners can also be used as capture devices. In these cases, the shading is optical at the time of capture. (For example, a colored transparency can be placed over a print to provide the encodement filtering.) The resulting digital images are treated in the same manner as digital images produced from film images. Digital filtering, instead of optical filtering, is possible; but is currently believed to be desirable only as a way of using the same photofinishing system and digital modifications for digital and film images.

A monochrome digital image can be generated from a color digital image within the processing steps of the digital photofinishing systems by using the luminance signal $L_{ij}$ described above in equations (1) and (2). For example, the starting color digital image is first transformed into a luminance-chrominance representation using equation (2). For the case of an encodement filter that produces an overall color-cast effect, the overall color cast can be removed by subtracting the corresponding color cast from the GM and ILL chrominance signal information. The luminance signal can be used directly as a black and white digital image. However, once the color-cast induced by the encodement filter has been removed, any other color cast for enhancement can now be induced. For example, the equivalent of an optical red color filter can be synthesized by transforming the encodement color-cast removed digital image back into a red-green-blue representation. Next, the red pixels of the processed digital image can be reduced in numerical value to synthesize the effect that a red color filter would have. A final black and white digital image can then be produced by calculating a luminance signal using equations (1) or (2). In addition, a sepia digital image can also be produced by setting the chrominance values of the processed digital image to a constant value corresponding to the sepia color. Therefore, it will be appreciated that the effect on the image data induced by the encodement filter can be non-remedial in nature in the sense that the induced color-cast produced by the encodement filter is not intended to correct for or compensate for an image capture condition. Furthermore, this non-remedial filter effect is detected in the digital image derived from the recorded light image and digital modifications are made to the digital image in such a manner that a different filter effect is induced in the final processed digital image. Thus the induced filter effect of encodement filter is independent of the induced filter effect of the digital image processing. Still further, the non-remedial filter effect of the encodement filter can be removed from the derived digital image such that the no substantial filter effect induced by the encodement filter remains. Thus the final processed digital image can appear to have been produced by a photographic system that recorded the light image without the filter effect of the encodement filter.

Color filtering is generally described herein in an ordinary sense: subtraction of a color component of a light image. For purposes herein, "filtering" and like terms are inclusive of additive color changes to an overall scene image. For example, a colored light source, such as a light emitting diode, can be provided in a camera to add unmodulated colored light to a scene image admitted through a taking lens. This particular approach (adding umnodulated light at capture) is not currently preferred, since the effect is like haze, information content of the scene can be degraded.

Figure 5:
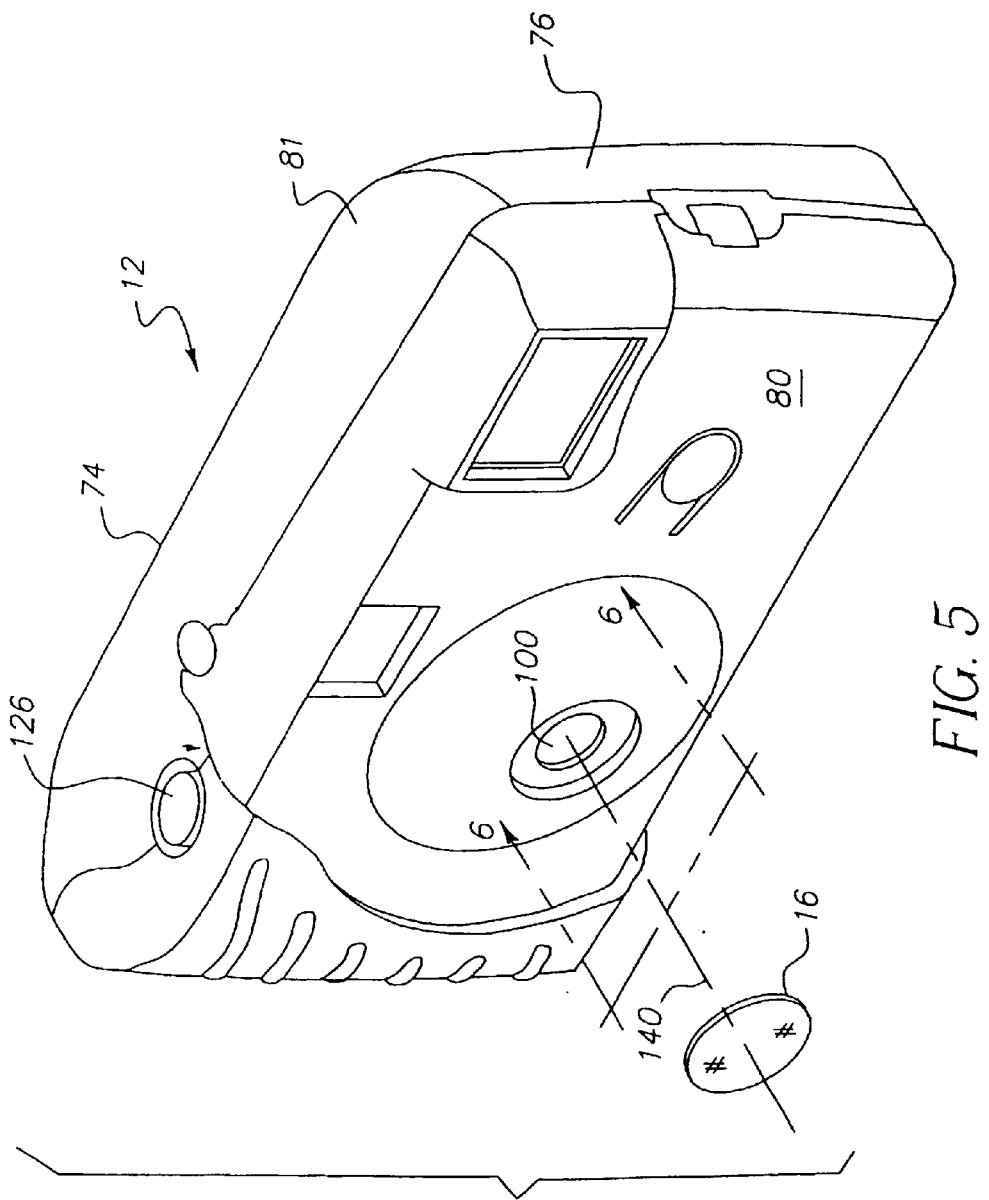
FIG. 5 is a front perspective view of a camera usable in the system of FIG. 4. The filter is shown disconnected from the remainder of the camera.
Figure 6:
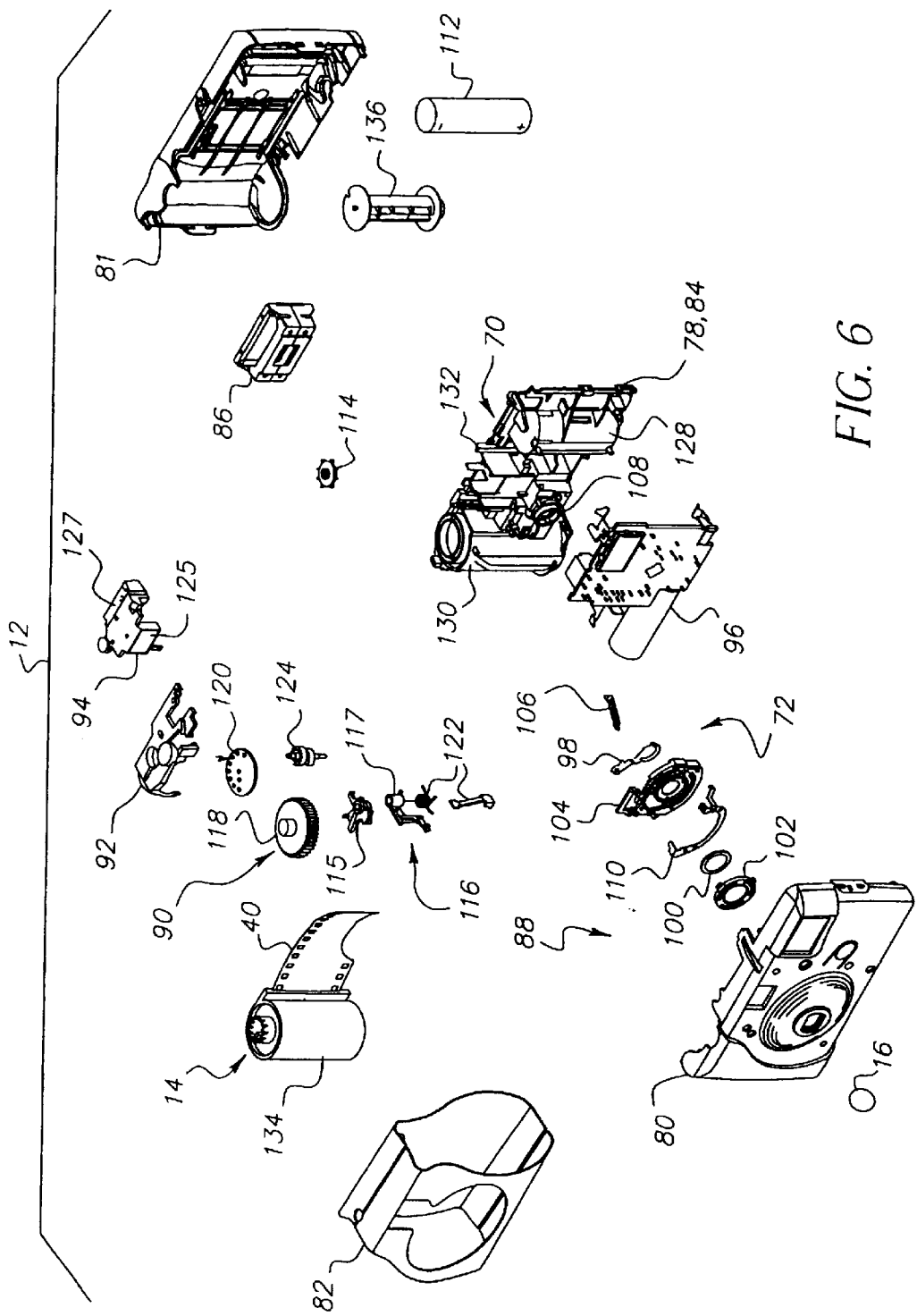
FIG. 6 is an exploded perspective view of the camera of FIG. 5.

Referring now to FIGS. 5–8, the camera 12 has a film holder 70, an exposure system 72 aligned with the film holder 70, and an encodement filter 16 interposed in a light path defined by the exposure system 72. A film unit 14 is held within the film holder 70. Referring to FIGS. 5–6, the camera 12 has a body 74 including a shell 76 and a baffled-frame 78. The body 74 provides structural support to other components. The shell 76 includes front and rear covers 80,81. The covers 80,81 are joined together and a label 82 (shown in FIG. 6) is adhered over the covers 80,81. The baffled-frame 78 is disposed between the covers 80,81. The baffled-frame 78 has a camera-frame 84 and a baffle 86 joined to the camera-frame 84.

The exposure system 72 is attached to the baffled-frame 78 or held between the baffled-frame 78 and covers 80,81. The exposure system 72 includes a taking lens and shutter assembly 88, a film transport unit 90, a keeper plate 92, a viewfinder unit 94, and a flash unit 96. Features of the exposure system 72 are only briefly discussed here, since such components are well known to those of skill in the art.

The taking lens and shutter assembly 88 includes a shutter 98, a taking lens 100, and support members 102,104. A rear support member 104 holds the shutter 98 and one or more shutter biasing springs 106 against a mount portion 108 of the baffled-frame 78. The front support member 102 holds the taking lens 100 against the rear support member 104. The flash unit 96 adjoins the shutter assembly 88 and has a flash contact 110 that is touched by the shutter 98 during image capture. The shutter blade 98 is electrically conductive. A battery 112 is joined to the flash unit 96 to provide power.

The film transport unit 90 includes a sprocket wheel 114 for engaging film perforations, a multiple piece metering-charging assembly 116, and a film advance 118 that is operated by the user to supply rotary motion to the film transport unit 90. A counter-wheel 120, also present, is driven by the metering-charging assembly 116. The metering-charging assembly 116 includes metering and high energy levers 115, 117, one or more biasing springs 122, and a rotary multiple level cam unit 124 that engages and operates the sprocket wheel 114. The keeper plate 92 has an integral shutter release 126 that, through the metering assembly 116, releases the shutter 98 for picture exposure. The viewfinder unit 94 includes a pair of opposed lenses 125,127 that fit in a tunnel 131 defined by the frame 78.

The baffled-frame 78 includes the film holder 70, which has first and second film chambers 128,130, and an exposure frame 132 between the chambers 128,130. The canister 134 of a film cartridge 14 rests in the second chamber 130, while a spool 136 rests in the first chamber 128. An end of the filmstrip 40 of the film cartridge 14 is attached to a spool 136 in the canister 134 (this attachment is not shown). As exposures are made, the filmstrip 40 is wound into the canister 134. A film roll (not shown) formed by the filmstrip 40 is carried by the spool 136 until exposures are completed and the filmstrip 40, is fully or mostly housed in the canister 134.

Figure 7:
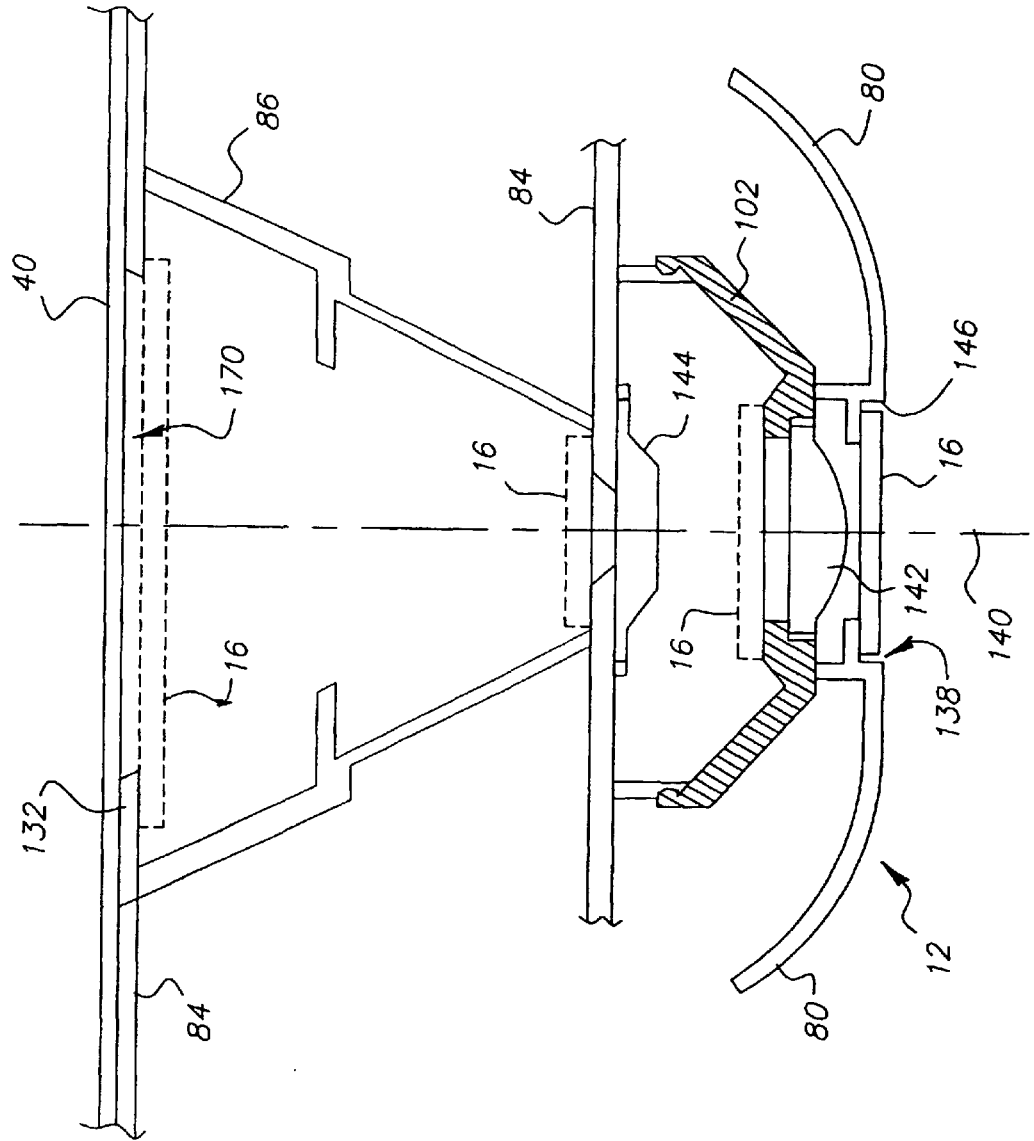
FIG. 7 is a partial cross-sectional view of a modification of the camera of FIG. 5 taken through the light path of the taking lens unit. The filter is indicated by a solid line. Alternative positions for the filter are indicated by dashed lines.

The encodement filter 16 is attached to the front cover 80 over an opening 138 in the front cover 80. The opening 138 is aligned with the optical axis 140 of the taking lens 100 and is part of a light path defined by the taking lens 100 and leading to a film frame (not illustrated here) located at the exposure frame 132. The encodement filter 16 can be located anywhere in the light path. FIG. 7 illustrates another camera 12, in which the taking lens 100 has a pair of lens elements 142,144. The shutter is not illustrated, but can be positioned, for example, between the elements. The encodement filter 16 is shown in solid lines in a first position in a recess 146 in the front cover 80. Some alternative positions for the filter 16 are indicated by dashed lines. In those alternative positions, the filter 16 is between two elements 142,144 of the lens system 100, interior to the rear lens element 144, and directly over the film 40 at the exposure frame 132.

FIG. 8 illustrates an alternative in which a front cover 80 of a one-time-use camera 12 has a pair of opposed brackets 148 adjoining the lens system 100. A filter 16 within a rectangular filter holder 150 is slidable (as indicated by arrow 152) along the brackets 148 between a use position over the lens and a store position (shown in FIG. 8) in spaced relationship to the optical path defined by the lens system 100. A similar sliding filter mechanism can be provided internal to the front cover 80. Other filter movement mechanisms can be used, For example, internal and external filter wheels are well known to those of skill in the art.

The above discussion is directed to uniform filtering. Encoding can alternatively be provided by non-uniform shading or filtering. The term "shading" is used here to refer to both filtering and full light blocking (also referred to herein as "shadowing").

Figure 9:
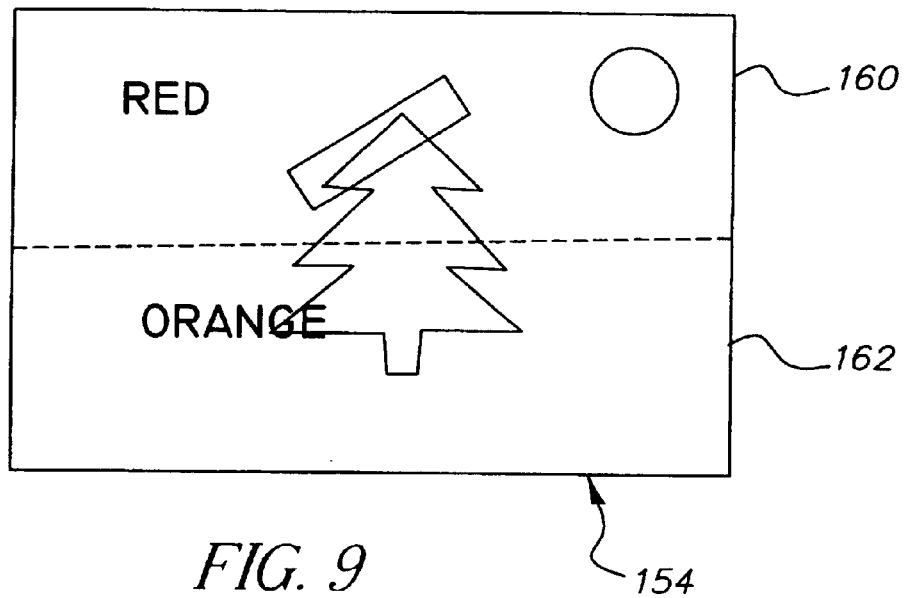
FIG. 9 is a diagrammatical view of the encodement filtered exposure opening of another embodiment of the camera.

For example, referring to FIG. 9, an encodement filter can have a pattern. In FIG. 9, an upper portion 160 filters in one color and a lower portion 162 filters in another color. The effect of the filtration can be removed in digital processing. Alternatively, the effects can be retained. For example, FIG. 9 filters part of the image in orange and the other part red. If neutral densities are the same in both parts, and the associated modification is changing a color image to a monochromatic image, then the effects on a monochromatic image are not very noticeable in some uses.

Encoding can also be provided by partial shading. In partial shading, only part of a captured image of a scene is shaded. The partial shading is skewed relative to one or both pairs of edges 156,158 of the exposure frame 132. The partial shading is skewed in the same manner as to corresponding and respectively adjoining edges of the captured image. (For convenience, the following refers only to edges 156,158 of the exposure frame 132.) The term "skewed" is used in its ordinary senses to refer to shading that clips the image in a direction that is oblique to both pairs of edges 156,158, and to shading that clips one member of one of the pairs of edges 156,158 more than the other, and to shading that does both.

In partial shade encoding, encoded information can be conveyed by the location of shaded areas, the shape of those shaded areas, the type of shading provided, and combinations of these features. The shading type can be complete in the shaded areas, using a shading screen 154 having opaque regions, or alternatively, the shading can be incomplete in shaded areas by using a shading screen 154 that has areas of filtering. Shadowing and filtering can be combined in a shaded area and filtering can be provided in a particular filter pattern.

The cameras 12 of FIGS. 5–8 can be modified to provide skewed shading in place of the uniform filtering earlier discussed by replacing the encodement filter 16 with a shading screen 154. The shading screen 154 can be fixed in place, that is, immobile, relative to the exposure frame. In particular embodiments, a plurality of different shading screens 154 are movable into position relative to the exposure frame 132, in alternation. In other embodiments, a shading screen 154 is movable relative to the exposure frame 132 so as to change the location of shaded areas, and in some cases, the shape of shaded areas.

The complexity of the encodement pattern or shading pattern can be varied as desired, within practical limits for detection. For example, a shaded area can have a saw-toothed edge. The shading pattern can be optimized to meet the requirements of a particular system. For example, in some cases it is desirable to retain at least a part of vertical edges of the film image, so that the length of the film frame remains defined by the overall length of the film image. This reduces the risk that a filmstrip will be misregistered and scanning will be mispositioned relative to actual film frames, since positioning can be positively determined for each frame by detecting the vertical film image/film frame edges.

A saw-toothed edge pattern can be detected in a digital image with the employment of a template matching method. Such a method can include convolving a pixel template, i.e. a binary arrangement of pixel values that resembles the size and shape of the expected saw-toothed edge pattern, with the image pixel data in the region of pixels (also referred to herein as "subarea") where the saw-toothed edge pattern can be located. The convolution operation involves multiplying the pixel values of the template with the pixel values of the digital image. These multiplied values are then summed to provide a template position metric that can be used to indicate the likelihood of the saw-toothed edge pattern being detected. This convolution operation is performed with the template at different positions relative to the digital image. Thus the template position metric is calculated for multiple positions of the template. A high value for the template position metric indicates a higher likelihood that the saw-toothed edge pattern is in the image pixel data. The multiple template position metric values can be sorted to identify the most likely position of the saw-toothed edge pattern. The highest template position metric value can then be compared with a threshold template position metric value to determine if the saw-toothed edge pattern is present or is not present.

Other spatial patterns imparted to the digital image to be processed by the encodement filter can be detected using the template matching method described above. For example, the encodement embodiment illustrated in FIG. 26 and described in more detail below, produces a shaded portion of a corner of the image area. This shaded portion has a characteristic angle based on the position of the encodement mechanism. For this case, a straight edge template can be used for the template matching method described above. To determine presence of the straight edge pattern, the convolution operation is repeated for different positions as well as different orientations of straight edge template pattern. As described above, when the orientation and position of the straight edge template pattern matches the orientation and position of the shadowed region, a positive determination can be made.

The earlier described color cast detection procedures can also be used to detect a color cast in a predetermined area of an image. The various filter effect detection procedures can be repeated for different areas of an image and different procedures can be used in an combination. With skewed shading, identifiers are used in the same manner as earlier described in relation to encodement filtering.

Figure 10:
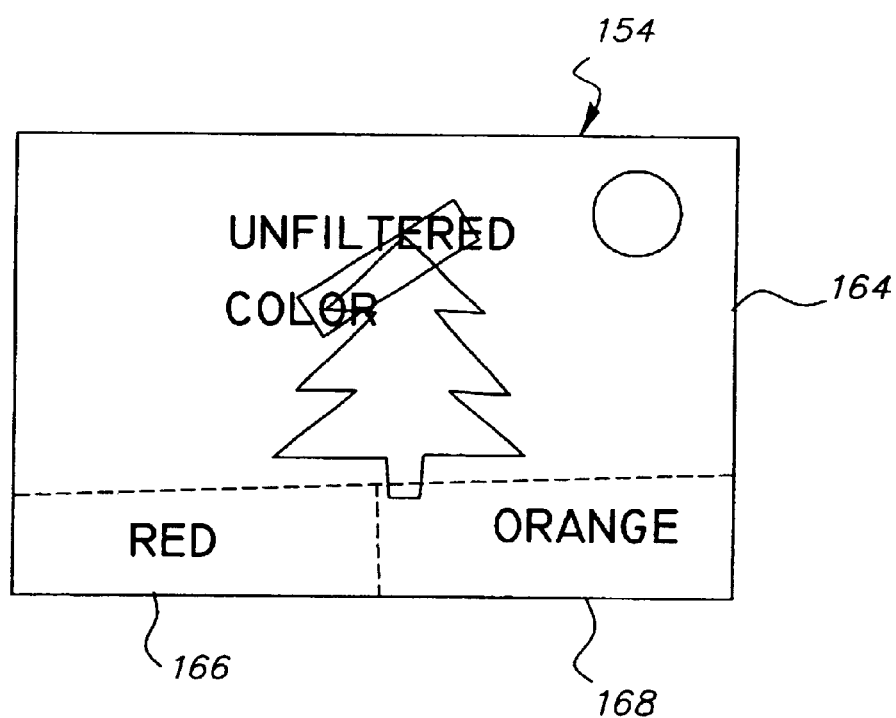
FIG. 10 is a diagrammatical view of the encodement filtered exposure opening of still another embodiment of the camera.
Figure 13:
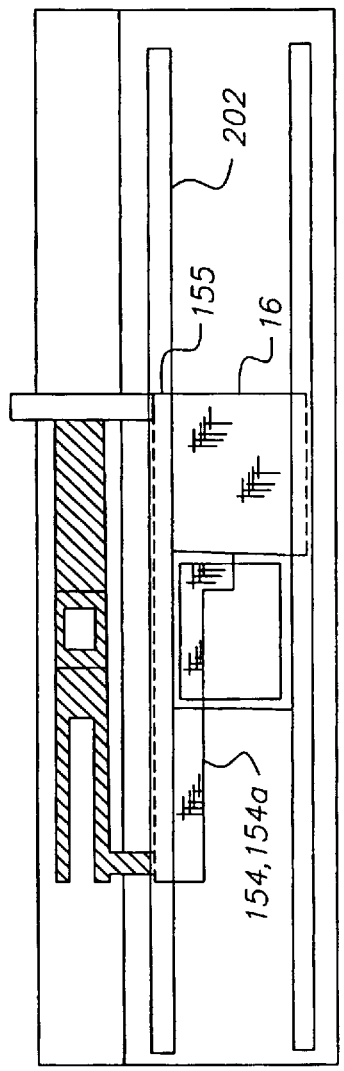

Referring to FIG. 10, a non-uniform shading screen 154 can limit shading to only a small portion of the image. The size of the portion shaded is large enough to be easily detected. The effect of the shading is limited so as to not unacceptably degrade the final image. With filtering, this can make the results, whether a filter effect or a degradation of the image due to a digital reversal of a filter effect, less noticeable in a final image. In FIG. 10, a large part 164 most of the image is unfiltered. The remainder has two smaller areas 166,168, filtered red and orange, respectively.

Cameras 12 providing skewed shading are mostly like the cameras 12 earlier discussed. Notably, the film holder 70 has a rectangular exposure frame 132 having two pair of opposed edges 156,158. The edges 156,158 surround the exposure opening 170. The taking lens system 100 has an optical axis 140 extending through the center of the exposure opening 170. The lens system 100 transmits a light image of a scene along a light path, through the exposure opening 170 to a film frame held in the exposure frame 132. At the exposure opening 170, the light image is bordered by the two pair of opposed edges of the exposure frame 132.

Referring now to FIGS. 11–31 and 36–37, some skewed shading cameras 12 have a guide 202 mounted to the body 74. The guide 202 supports a screener 153 having one or more shading screens 154. The guide 202 defines a plurality of stations 204. The screener 153 is movable relative to the guide 202 to shift stepwise between the stations. In each station, a different shading pattern is provided at the exposure opening by the shading screen 154 then positioned over the exposure opening 170. The screener 153 is positioned differently relative to the optical axis 140 in each station 204. Positional differences can be rotational or translational or both. The screener 153 remains attached to the camera 12 during movement between stations.

As with the filters 16 earlier discussed, the shading screen 154 can be positioned, for use, anywhere along the light path. For example, in the camera 12 of FIG. 8, the filter 16 can be replaced with a screener 153 having a single shading screen 154. In that case, the brackets 148 of the camera 12 of FIG. 8 are the guide 202. The overall configurations of the screener 153 and the guide 202 are determined by the number of stations 204, the manner of movement of the screener 153, and the configurations of the shading provided.

Referring now to FIGS. 11–14, a camera 12 is shown, in which a rigid screener 153 has a plurality of shading screens 154 that are of one-piece with a support structure 155. One shading screen 154a is rectangular and is positioned across the top of the exposure opening. The second shading screen 154b is L-shaped and extends over the top and one side of the exposure opening. Continuous with the second shading screen is an encodement filter 16. The screener 153 is moved between stations 204 by translation lengthwise over the exposure frame 132. The filmstrip 40 is not shown in these figures, but would be brought along the guides 202 to and past the exposure frame 132. This approach is described here for ease in understanding. An actual camera would have cumbersome dimensions, as is apparent in FIGS. 11–14, but would be workable.

The guide 202 has the form of a pair of grooves (indicated by boxes in FIGS. 11–14), within which the screener 153 slides. A screen driver 208 in the form of a tab 208a, extends upward from the screener 153 to the outside of the camera 12 and is moved by the user to move the screener 153 from station 204 to station 204. Light locking is provided for the tab 208a. For example, the tab 208a can be crank-shaped and can travel in a slot (not shown).

In a first position of the screener, shown in FIG. 11, no shading is present. In a second position shown in FIG. 12, the shading screen shades the upper longitudinal edge of the exposure frame 132. The shape of the area shaded is rectangular. The shading is skewed, in that the lower edge is unshaded. In a third position shown in FIG. 13, uneven shading is provided in an L-shaped area.

In some cases, the size and shape of a shaded area can be matched to a particular photofinishing modification, such that the shading is inconsequential to the final image. In the case of FIG. 12, for example, a modification for a pseudo-panoramic final image does not use the shaded area. Similarly, in FIG. 13, a particular pseudo-zoom (magnification of a central area) is provided that is interior to the shaded area.

Figure 14:
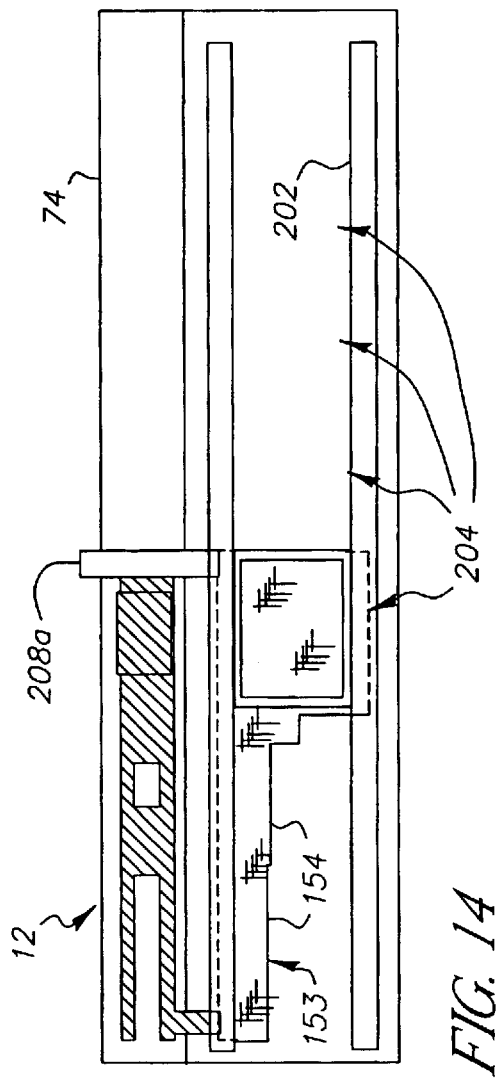

In a fourth position shown in FIG. 14, filtering is provided. This filtering can be used as a filter encodement or for an artistic effect, depending upon how the presence of the filtering effect is interpreted by the photofinishing unit 38. As with skewed shading and filter encoding in general, the effect of particular encodements is predetermined for a particular photofinishing channel.

A viewfinder mask unit 209 is joined to and travels with the screener 153. The mask unit 209 has three viewfinder masks 211a,211b,211c. The masks 211a,211b,211c are joined together by a support structure 213. The masks 211a,211b,211c are aligned with the shading screens 154a, 154b and encodement filter 16, respectively. The shading screens 154a,154b are associated with digital modifications that can be demonstrated in the viewfinder. Each mask 211c indicates to the user the digital effect associated with the respective shading screen 154 or encodement filter 16.

Shading screen 154a is associated with a pseudo-panoramic modification. Shading screen 154b is associated with a pseudo-telephoto modification. The respective viewfinder masks 211a,211b filters portions of the scene image that will not appear in the respective final images produced. Mask 211c communicates the presence of encodement filtering (or artistic filtering) through a color. Masks 211a,211b can have opaque rather than filtering portions. Viewfinder masks can convey the nature of the digital modification in other ways, such as with indicia, such as textual messages (not shown).

A more practical modification of the camera shown in FIGS. 11–14 appears in FIGS. 15–17b. In this case, the screener 153 is a flexible belt and the guide 202 has a pair of spaced apart rollers 210. The screener 153 includes shading screens 154a,154b and a filter 16, in the same configurations as in the camera of FIGS. 11–14, joined together by a transparent support structure 155. The guide 202 is positioned, within the camera 12, just forward of the exposure frame 132. The screener 153 extends across the exposure frame 132 and is attached at each end to a respective roller 210. The screener 153 is wrapped around one or both rollers 210 and is moved between the two rollers 210, as required, to move the screener 153 from station 204 to station 204 to position the shading screens 154 and filter over the exposure opening.

Figure 15:
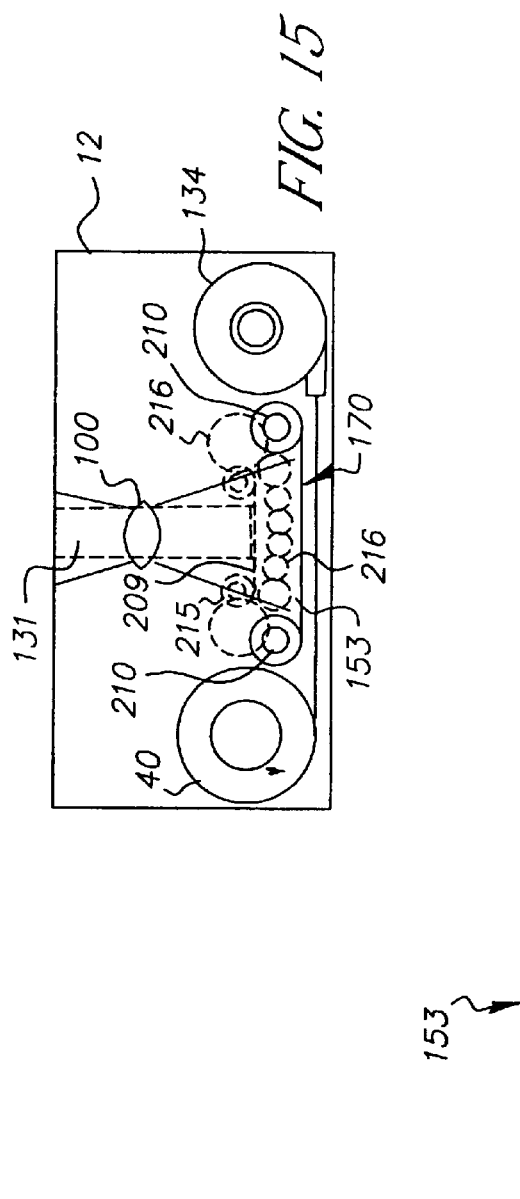
FIG. 15 is a semi-diagrammatical view of a modification of the camera of FIGS. 11–14.

Referring now to FIGS. 15 and 17b, the viewfinder mask unit 209 is also a flexible belt that is rolled and unrolled between a second pair of spaced apart rollers 215. (These features are indicated by dashed lines in FIG. 15.) The viewfinder mask unit 209 has three masks 211a,211b,211c that are joined together by a support structure 213. The masks 211 indicate digital modifications of corresponding shading screens 154, as earlier discussed. Each mask 211 is aligned with the viewfinder (the viewfinder tunnel 131 is indicated by dashed lines in FIG. 15).

The viewfinder mask unit 209 and screener 153 are moved in unison by a screen driver 208, in the form of a knob 208b exposed on the outside of the body 74 of the camera 12. The knob 208b is connected to the rollers 210,215 by a geartrain 216 (indicated in FIG. 15; a shaft extending from the knob to the geartrain is indicated by dashed circle 218 in FIG. 16). Movement of the screener 154 from station 204 to station 204 is geared to require a quarter turn of the knob 208b. A detent 220 holds the screener 154 at each of the stations 204. In a first screener position, the exposure opening is covered only by the transparent support structure 155. In three other screener positions, shading screens 154a, 154b, and filter 16, respectively, are in place over the exposure opening. In the first screener position, the viewfinder is uncovered. In the three other screener positions, masks 211a,211b,211c, respecitvely, are in place over the viewfinder.

Figure 16:
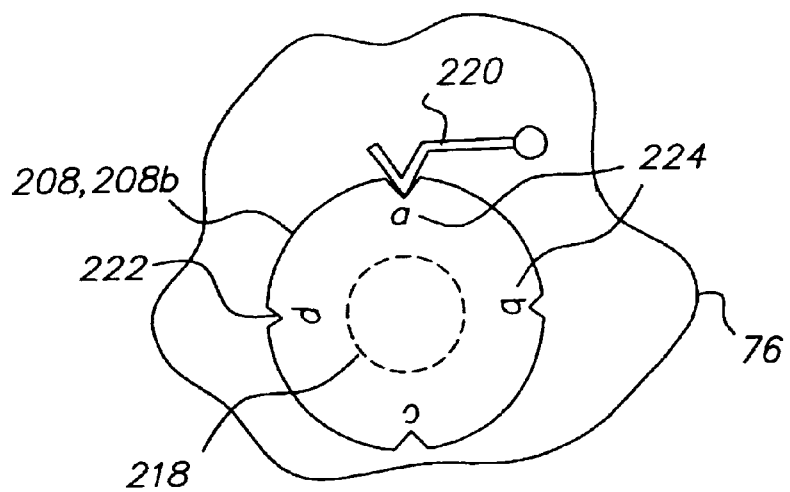
FIG. 16 is a partial top view of the camera of FIG. 15, showing a control knob.

The detent 220 in FIG. 16 is a leaf spring fastened at one end to the camera body 74. A protrusion of the detent engages one of a series of receivers 222 on the knob 208b. Each receiver 222 is located so as to position the screener 153 in a respective station 204. Indicia 224 identifying corresponding digital modifications adjoin respective receivers 222.

Particular detents 220 can take the form shown in FIG. 16, of biasing members that tend to hold the screener 153 at a particular station 204, or, alternatively, can be over-center mechanisms that drive the screener 153 from station 204 to station 204 in response to an initial impulse. Such mechanisms and a wide variety of detents 220 in all forms are well-known to those of skill in the art. The effect of detents 220 is to render screener movement stepwise from station 204 to station 204, by deterring or discouraging smaller screener movements. Detents can be positioned anywhere convenient, such as on the screener 153, or mask unit 209 or drive 208.

The cameras 12 illustrated provide for a manual screen driver 208. Automated screen drivers 208 can, alternatively, be provided. For example, a screener 153 can be driven by a stepper motor or the like (not shown) controlled by the control unit In that case, detents can be provided by appropriate programming.

Figure 18:
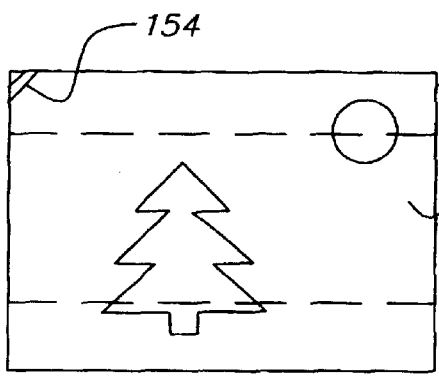
FIGS. 18 and 19 are diagrammatical views of shaded outline encoded exposure openings of another embodiment of the camera.
Figure 19:
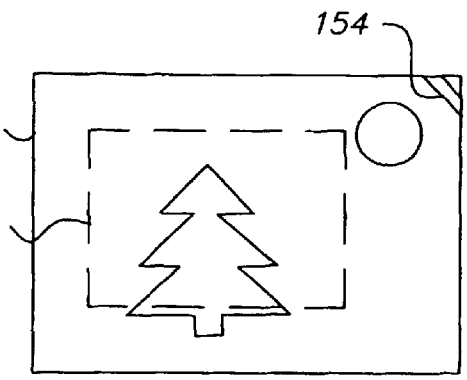
Figure 20:
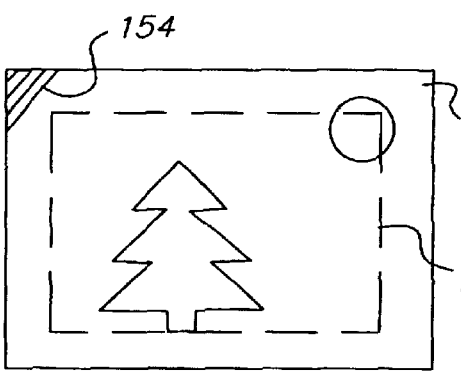
FIGS. 20 and 21 are the same views of yet another embodiment of the camera.
Figure 21:
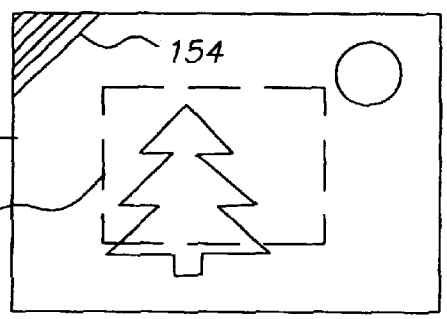
Figure 22:
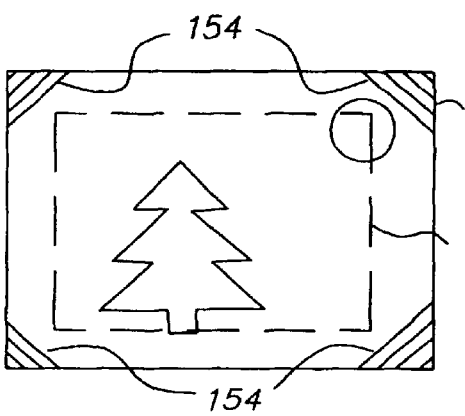
FIGS. 22 and 23 are the same views of still another embodiment of the camera
Figure 23:
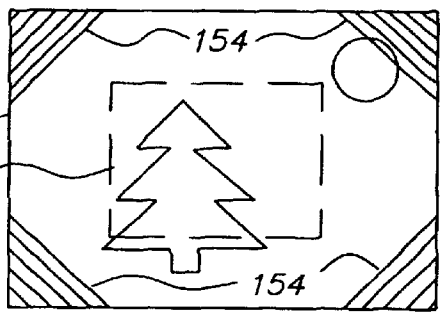

FIGS. 18–23 illustrated some other shading screen alternatives (indicated by cross-hatch areas) and respective digital modifications (indicated by dashed lines) to the scanned image. In FIG. 18, a shading screen 154 clips the upper left corner of the latent image. The corresponding modification is a pseudo panoramic final image. In FIG. 19, a shading screen 154 clips the upper right corner of the latent image and the corresponding modification is a pseudo telephoto image. In FIG. 20, a larger portion of the upper left corner is clipped by the shading screen 154 and the image is digitally zoomed in to a first extent in the modification. In FIG. 21, a still larger portion of the upper left corner is clipped and the zoom magnification provided by the modification is greater than in FIG. 20. In FIG. 22, all four corners of the latent image are shaded. This clipping of the image does not interfere with the final image since the modification provides the same zoom magnification as in FIG. 20. In FIG. 23, the four corners of the latent image are clipped still further. The zoom magnification is the same as in FIG. 21.

Referring now to FIGS. 5, 6 and 24a–31, a modification of the camera 12 of FIG. 6 has general features like earlier discussed cameras 12. The camera 12 has a body 74 having a shell 76 and a camera frame 78 mounted within the shell 76. The body 74 provides structural support to the other components. The shell 76 includes front and rear covers 80,81. The shell 76, in the illustrated embodiment, has a pair of opposed covers 80,81.

The camera 12 has a film holder 70, an exposure system 72 aligned with the film holder 70, and a shading screen 154 interposed in a light path defined by the exposure system 72. The film holder 70, which is part of the frame 78 in the illustrated embodiments, has an exposure frame 132 surrounding an exposure opening 170. A film unit 14 is held within the film holder 70.

The exposure system 72 is mounted in the body 74. The exposure system 72 has a taking lens 100 that has an optical axis 140. At picture taking, the taking lens 100 transmits a scene image through the taking lens 100 and baffle 86 to the exposure opening 170. The exposure system 72 is attached to the frame 78 or is held between the frame 78 and the covers 80,81. The exposure system 72 includes a taking lens and shutter assembly 88, a film transport unit 90, a viewfinder unit 94, and a flash unit 96.

A screener 226 is mounted within the body 74. The screener 226 is rotatable relative to the exposure frame 132 about a rotation axis 254 (indicated by "+" in FIG. 24b). The screener 226 rotates between a primary position and one or more secondary positions. The different positions or stations are located at different angular rotations of the screener 226 relative to the exposure frame 132. Detents can be provided, in the same manner as earlier discussed, to help limit movement of the screener 226 to discrete steps between neighboring stations.

The screener 226 has a shading screen 154 that blocks or filters light transmitted through it. The shading can be uniform or non-uniform across the shading screen 154. The shading screen 154 can be opaque. In this case, the shading blocks substantially all light and the shading is also referred to as shadowing. The shading screen 154 can also be a filter, in which case, the shading is also referred to as filtering. The filter can be uniform or non-uniform in a predefined pattern. The shading screen 154 can have a combination of areas of filtering and areas of shadowing. In each of the secondary positions, the shading screen 154 partially covers the exposure opening 170, and shades a portion of the transmitted light image.

In the cameras 12 of FIGS. 24a–32, the screener 226 adjoins the exposure frame 132. The screener 226 can be placed elsewhere in the optical path, such as the filter 16 positions shown in FIG. 7. The screener 226 can be resized, as necessary, for the particular location.

Figure 24A:
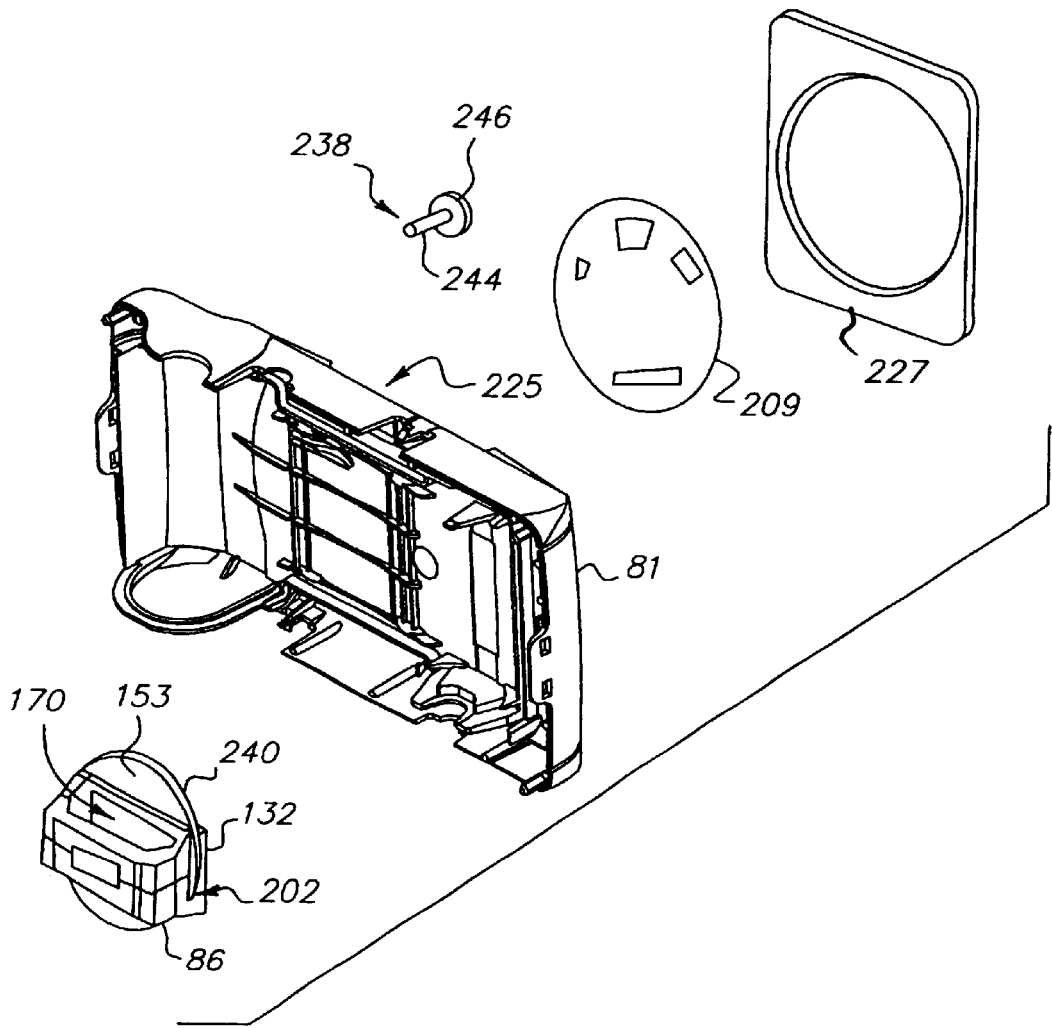
FIG. 24a is a perspective view of some of the parts of a modification of the camera of FIG. 6, in the same view as FIG. 6.
Figure 24B:
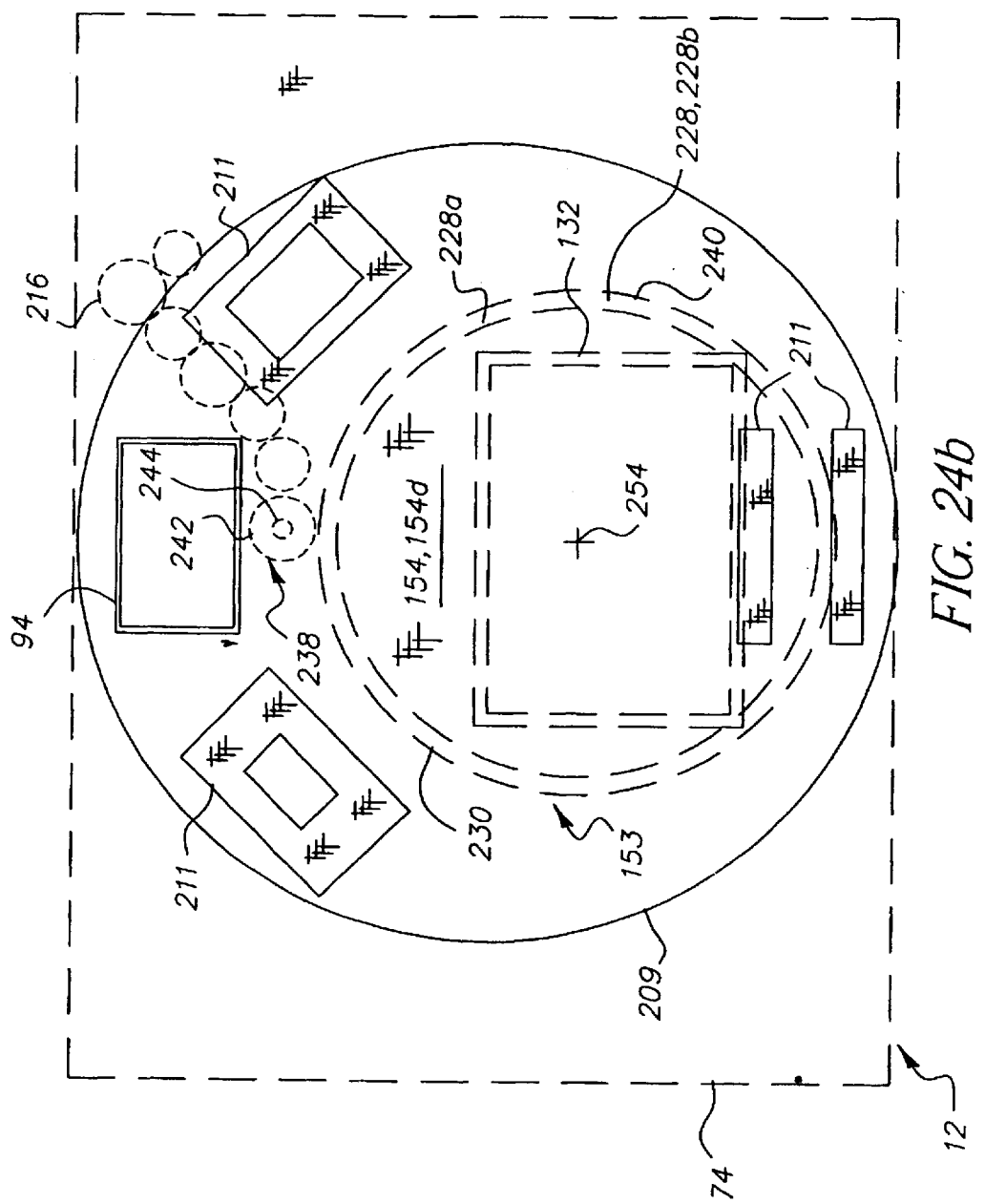
FIG. 24b is a semi-diagrammatical rear view of the camera of FIG. 24a Solid lines indicate the position of a viewfinder and viewfinder screener. Dashed lines show the exposure frame, screener and part of the screen drive.
Figure 25:
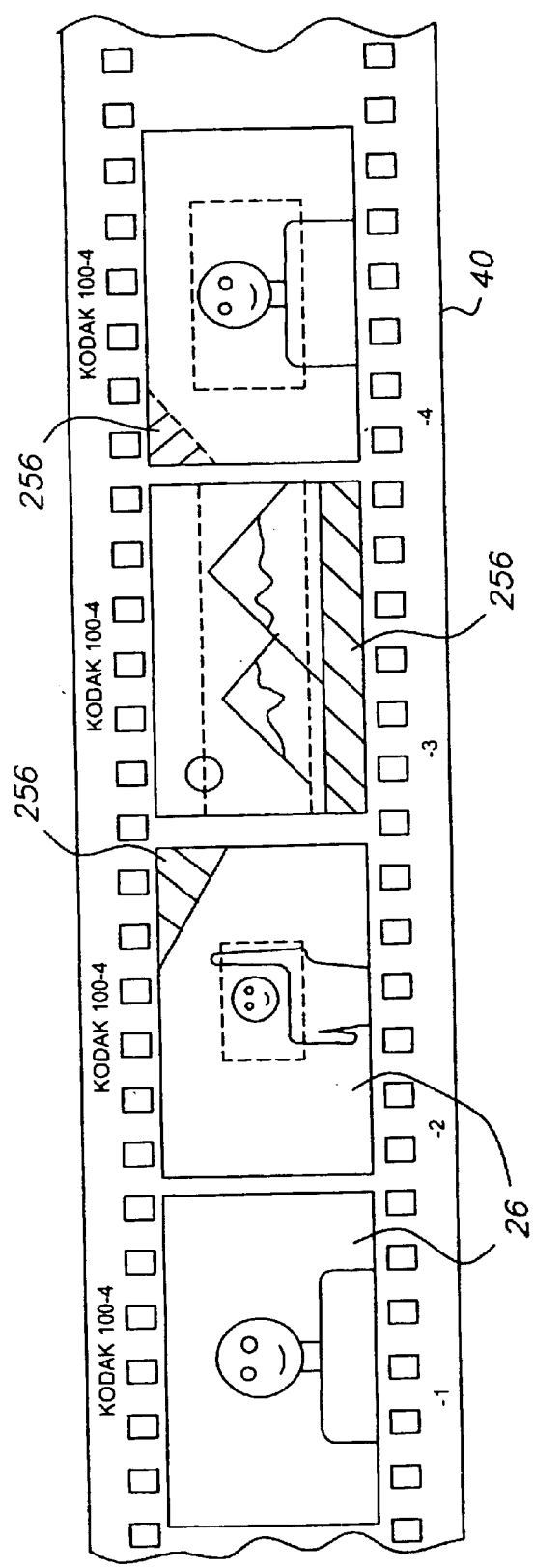
FIG. 25 is a semi-diagrammatical view of a developed filmstrip from the camera of FIG. 24. Four film frames are shown. The last three have different shaded outline encodements.

Referring to FIG. 24*b*, the shading screen, in these embodiments, is shaped like a portion of a circle and is indicated by reference number 154*d*. The screener 153, includes the shading screen 154*d* and a support structure in the form of one or more ring segments 228.

Figure 26:
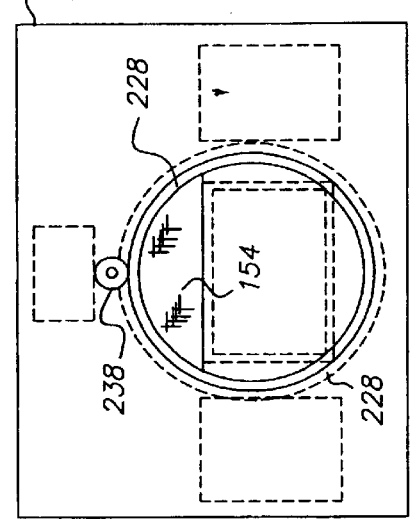
FIGS. 26–29 are semi-diagrammatical rear views of the camera of FIG. 24 showing the second screener in four different positions corresponding to the four film frames shown in FIG. 25 (from left to right). For clarity most camera features, including the viewfinder screener, are not shown.
Figure 27:
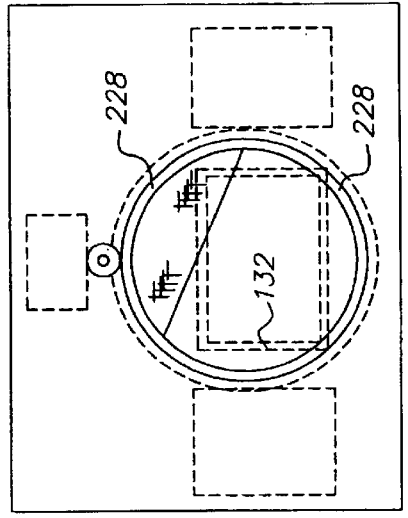
Figure 28:
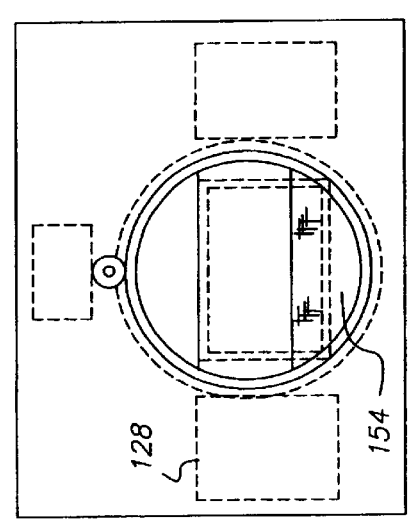
Figure 29:
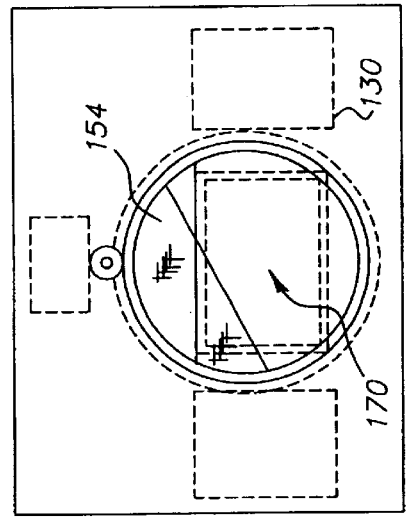

The shading screens 154*d* each have a border 230 having an arcuate portion 232 and a connecting portion 234. The arcuate portion 232 has a pair of opposed ends 236. The connecting portion 234 extends between the ends 236 of the arcuate portion 232. In FIG. 26, the connecting portion 234 is straight and defines a chord of the circle. The connecting portion 234 can have other shapes (not shown), for example, serrated or stepped. Such shaped connecting portions 234 can be used to provide additional encodement information, such as camera type, or to better distinguish close rotational positions.

The shading screen 154*d* is joined to one or more ring segments 228. In this application, the term "near ring segment 228*a*" is used to refer to a ring segment that is radially fixed to the arcuate portion 232 of the border of the shading screen 154. The term "far ring segment 228*b*" is used to refer to a ring segment that extends outward at an end 236 of the arcuate portion 232 of the shading screen 154, either to a blind terminus or in a returning arc to the opposite end 236 of the arcuate portion 232. The ring segments 228 can form a complete circle or a lesser arc. The exposure opening 170 is rearward from the shading screen 154*d* and is sized to fit within the ring segments 228, so that the ring segments 228 do not shade the exposure opening 170.

The overall radial extent of ring segments 228 of a screener 226 is determined by the available primary and secondary positions for that screener 226. In the embodiments shown in FIGS. 26–29 the screener 226 must rotate at least 180 degrees to reach all of the available positions. In this case it is convenient to allow 360 degrees of rotational movement in either direction. In this embodiment, a near ring segment 228*a* extends along the arcuate portion 232 of the border 230 of the shading screen 154*d* and a far ring segment 228*b* is joined to the ends of the near ring segment 228*a* The near and far ring segments 228 together define a continuous ring.

The screener 226 can be limited to a near ring segment 228*a* or a far ring segment 228*b*. The angular extent of near and far ring segments 228 can also be less than 180 degrees. In these cases the angular rotation of the screener 226 is likewise limited.

A screener drive 238 acts on the ring segments 228 to rotate the screener 226 about the axis of rotation. In the illustrated embodiments, the ring segment 228 is a sector of a ring gear and the teeth (not illustrated) are located in the outer circumferential surface 240 of the ring segment 228. The screener drive 238 has a drive gear 242 that is meshed with the teeth of the ring segments 228. A shaft 244 connected to the drive gear 242 extends through the shell 76 to an externally mounted knob 246 that is manipulated by the user to move the screener 226 between the different positions. A gear train (not shown) can be used in place of the shading screen drive gear 242.

The screener 226 can, alternatively, have a length of one of the ring segments 228 (for example, a 30 degree length) exposed outside the camera body 74. In that case, the user can rotate the screener 226 directly. This approach has few parts, but necessary light locking is likely to be relatively complex.

The camera can include a viewfinder mask unit 209 that is driven in unison with the screener. An example is shown in FIGS. 24*a*–24*b*. In this case, the mask unit is a thin disk having a set of masks 211 arranged in different radial positions relative to a center (not indicated in the figures). The masks 211 are connected by a support structure 213. In the embodiment shown in FIGS. 24*a*–24*b*, the support structure 213 is transparent. The masks 211 filter or shadow portions of the viewfinder that will not appear in a final image after expected digital processing. The mask unit 209 is held in a recess 225 between the rear cover 81 and an outer panel 227 and is operated by a gear train 216 meshed with drive gear 242.

The screener drive 238, like the screen drivers 208 discussed earlier, can be modified, in a manner known to those of skill in the art. For example, friction wheels can replace gears. Likewise the screener drive 238 can be powered by an electric motor. For example, the screener drive 238 can be moved by a stepper motor controlled by the control unit 56. The user can operate the screener drive 238 through a switch or a user control connected to the motor through a programmable computer within the camera 12. Precise positioning of an electrically-driven screener 226 can be provided in the same manner as in the positioning of zoom lenses. For example, a stepper motor can be used, or, alternatively, feedback can be used to indicate when a particular position is reached. A friction disk or gear coupled to the rotary encoder can have a code plate (not illustrated) or the like to provide the feedback.

Referring to FIGS. 26–29 and 32–33, the screener 226 is held in place by the guide 202. The guide 202 grips the screener 226 sufficiently loosely that the screener drive 238 can rotate the screener 226. The guide 202 preferably only contacts a ring segment or segments 228. The area or areas of contact can be a small arc or can encompass the entire sweep of the screener 226.

In the embodiment shown in FIGS. 24*a*–24*b*, the guide 202 is a slot in the baffle 86 and the screener 226 rotates in the slot. In the embodiment of FIGS. 26–29, the guide 202 is a continuous, circular groove in the frame of the camera 12. In the embodiment shown in FIGS. 32–33, a pair of opposed, laterally extending flanges 248 are joined to the baffle 86. A pair of slots 250 are defined by the flanges 248, the lateral ends 252 of the exposure frame 132, and intervening portions of the film chambers 128,130. The lateral ends and flanges 248 have parallel adjoining surfaces bordering the slots. Those surfaces and the surfaces of parts of chambers 128,130 are the guide 202. The screener 226 is housed in the slots 250. The screener 226 is free of the guide 202 above and below the exposure frame 132.

In particular embodiments, the shading screen 154*d* is radially offset from the exposure opening 170 when the shading screen 154*d* is in the primary position. This is shown in FIG. 26. Rotation of the shading screen 154*d*, provided by the user manipulating the knob 246, clips different portions of the exposure frame 132 and the resulting latent image captured on film. The four developed frames of film shown in FIG. 25, from left to right, correspond to the positions of the shading screen 154*d* shown in FIGS. 26–29, respectively. Shading is indicated by cross-hatched regions 256. Respective digital modifications are no change, a first pseudo-zoom, a pseudo-panoramic, and a second, different pseudo-zoom. With these particular modifications and respective shading screen positions, the shading screen 154*d* can be opaque or filtering, without affecting the final image.

The primary position shown in FIG. 26 can be achieved by relocating the axis of rotation of the screener 226 from a position aligned with the optical axis 140 to an offset position, when the screener 226 is moved between the primary position and a secondary position. For example, the screener 226 and guide 202 of FIGS. 26–29 can be mounted so as to translate in a plane parallel to the exposure frame 132. In that case the shading screen 154 can be centered over the exposure frame 132 when shading is desired and moved away when shading is unneeded.

It is preferred, however, that the axis of rotation of the screener 226 be fixed in position within the camera 12. In that case, the axis of rotation of the screener 226 is parallel to and offset from the optical axis 140. The size of the shading portion is such that in the primary position, the shading portion is spaced from the exposure opening 170 or both the exposure opening 170 and the exposure frame 132.

Figure 30:
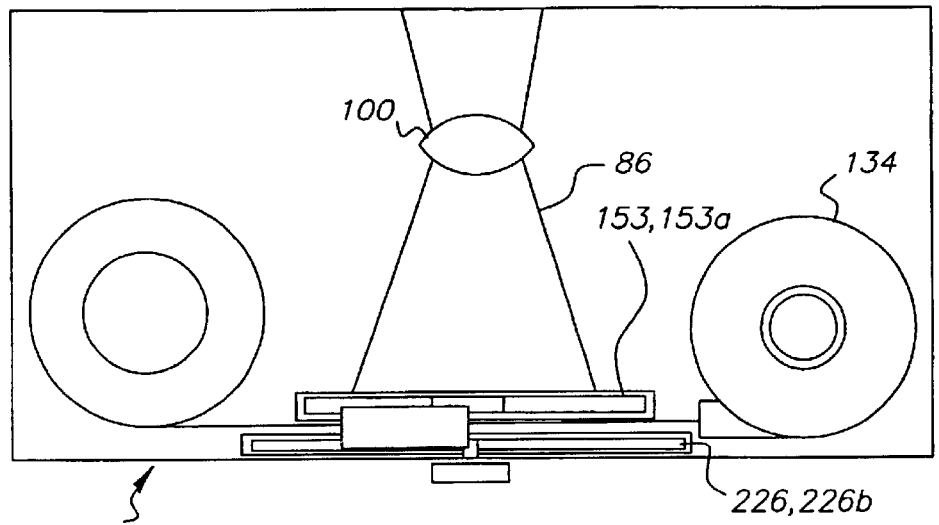
FIG. 30 is a diagrammatical cross-sectional view of the camera of FIGS. 26–29. Both screeners are illustrated.
Figure 31:
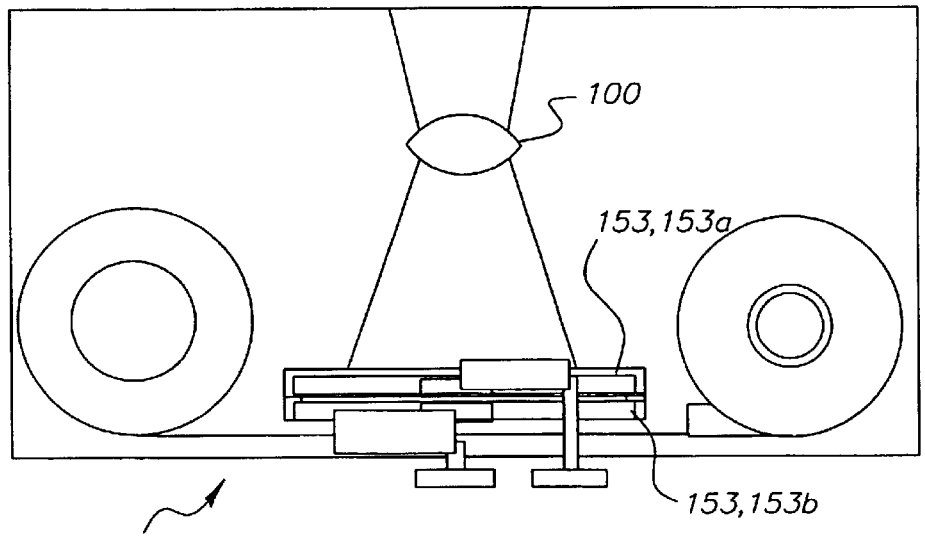
FIG. 31 is the same view as FIG. 30 of a modified camera The first screener is not shown.
Figure 32:
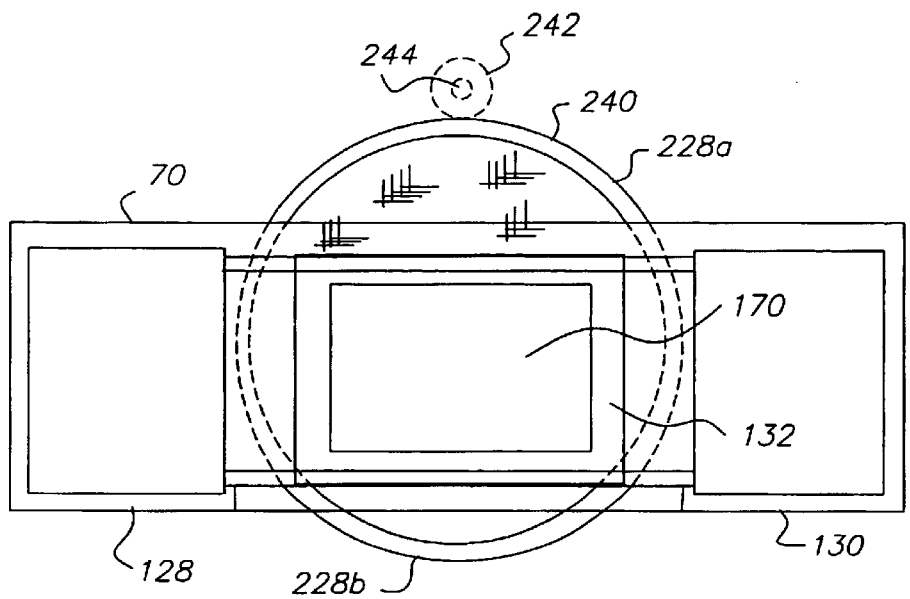
FIG. 32 is semi-diagrammatical rear view of a modification of the camera of FIGS. 26–29.
Figure 33:
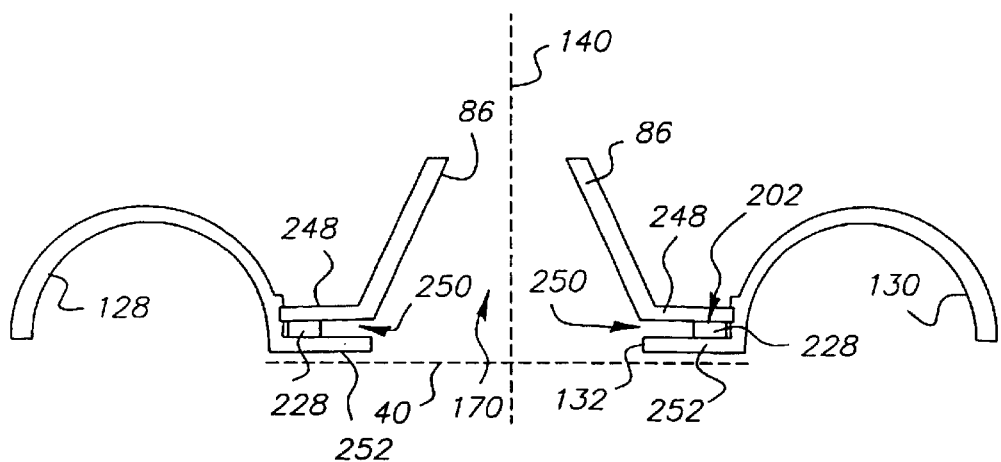
FIG. 33 is a semi-diagrammatical cross-sectional view of the camera of FIG. 32.

Referring now to FIGS. 30–31, the camera 12 can have two screeners 226 that are movable independently or in coordination relative to the optical axis 140. FIG. 30 illustrated two screeners 226 operated in coordination by a common screener drive 238. FIG. 31 illustrates two screeners 226, each operated by an independent screener drive 238. A forward screener 226a and a rearward screener 226b are both aligned with a common axis of rotation. The screeners 226 can be configured so as to not overlap. FIG. 30 shows a rearward screener 226b that is radially larger than the forward screener 226a. The shading screen 154d of the rearward screener 226b can be limited in radial extent to provide this result. The shading screens 154d can also be limited in angular size and/or rotation so that overlap of the two shading screens 154d is precluded. Alternatively, as shown in FIG. 31, shading portions of the two shading screens 154d can be chosen for compatibility, so that the effects of both can be discerned in all, or at least some, of the different positions of each shading screen 154d. For example, one shading portion can be a red filter and the other a blue filter.

Figure 37:
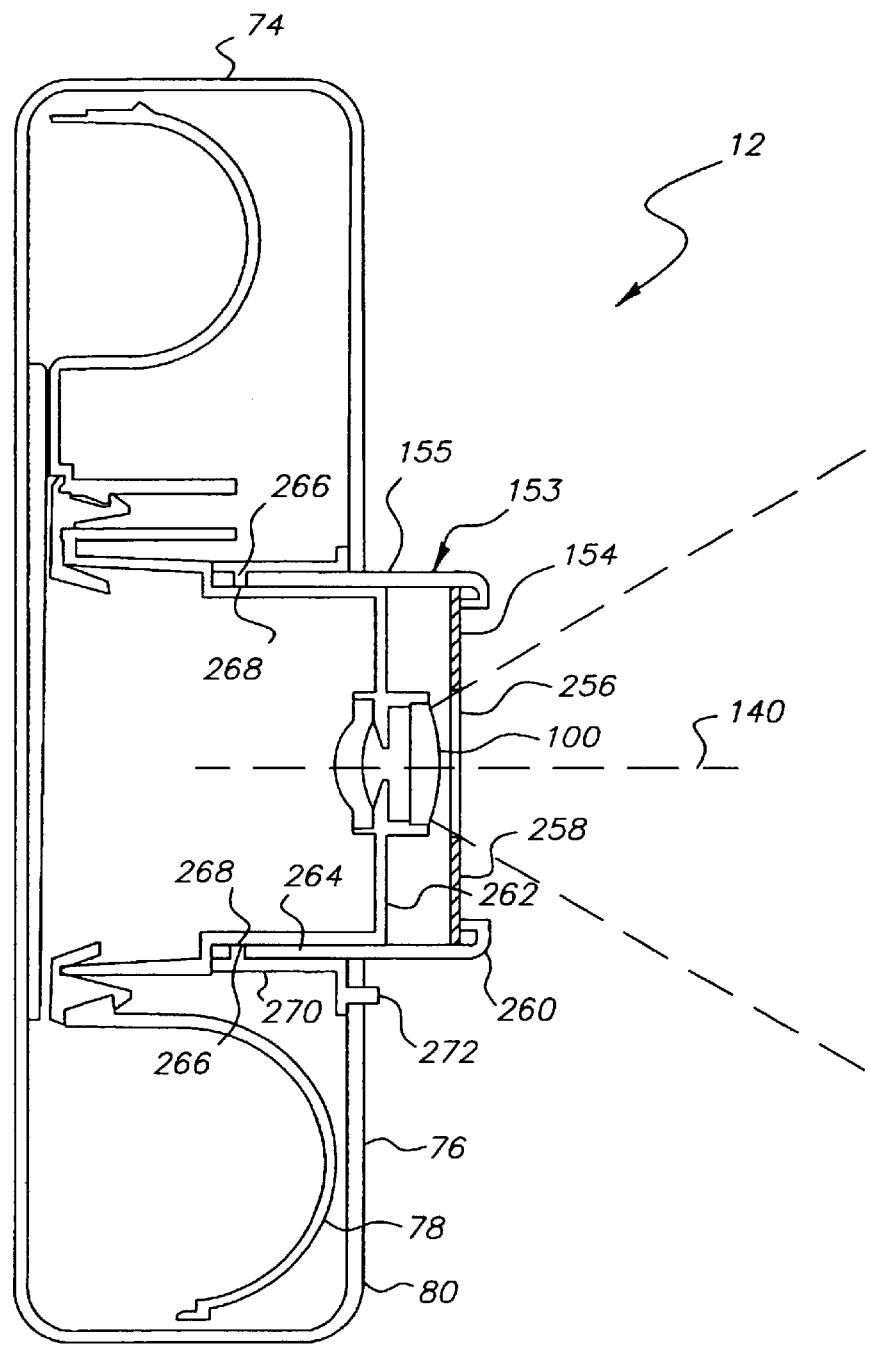
FIG. 37 is a semi-diagrammatical cross-sectional view of another emodiment of the camera. The shading screen is shown in a first position spaced from the light path of the taking lens.
Figure 38:
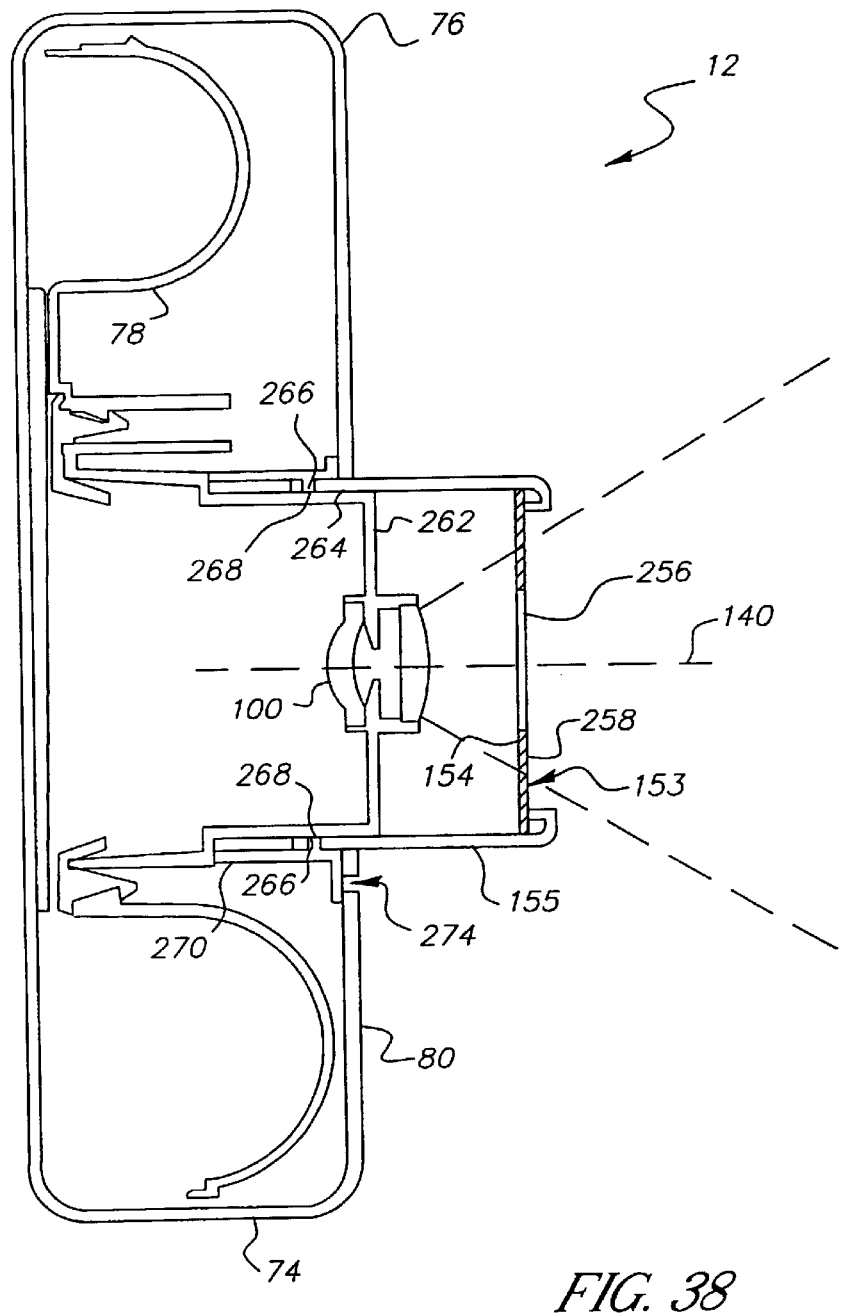
FIG. 38 is the same view as FIG. 37, but the shading screen is in a second position partially shading the light image propagated through the taking lens.
Figure 39:
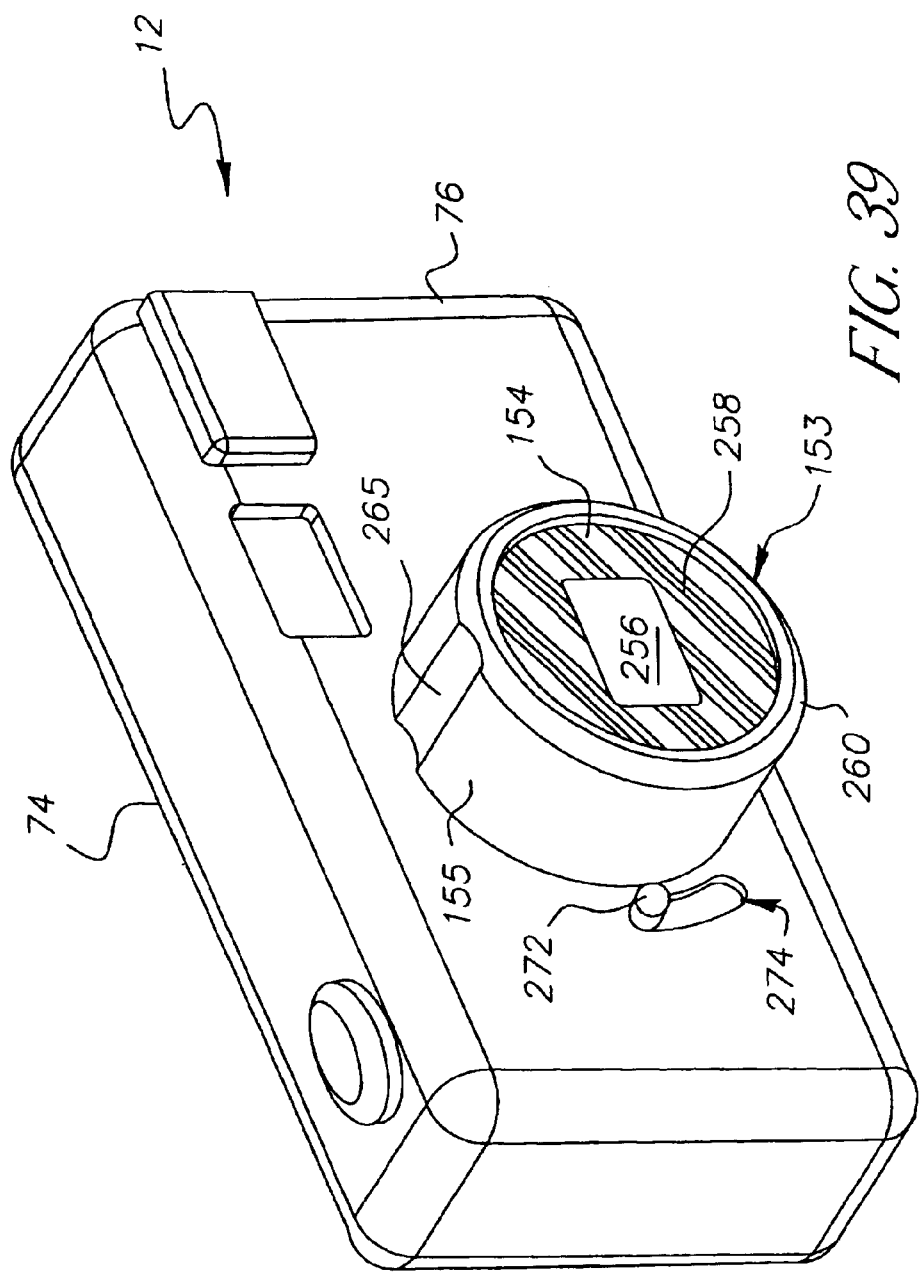
FIG. 39 is a perspective view of the camera of FIG. 37.

FIGS. 37–39 illustrate another camera. In this case the screener 153 has one shading screen 154 held by a support structure 155. The shading screen 153 is positioned exterior to the taking lens 100, in the same manner as a filter. The shading screen 154 has a transparent or empty center region and an opaque or filtering outer region 258. The support structure 155 includes a cowl 260 that overlaps the nose 262 or lens barrel (not shown) of the camera. The cowl 260 is joined to a driving portion 264 that provides for movement of the cowl 260 and shading screen 154 inward and outward along the optical axis 140. The movement can be solely axial, with no rotation, or the shading screen 153 can move both axially and rotationally about the optical axis 140. In the embodiment illustrated, non-circular portions 265 of the cowl 260 and nose 262 or key and keyway (not shown) prevent rotation of the screener 153 during movement.

In a first position, as shown in FIG. 37, the shading screen is spaced from the optical path of the taking lens 100. FIG. 38 shows another position of the screener 153, in which shading is present. Additional shading positions can be provided by detents or simply marked positions (not illustrated) of the cowl 260 relative to the shell 76 of the camera body 74. The driving portion 264 of the support structure 155 is adapted to provide the movement of the cowl 260 and shading screen 153. In the embodiment illustrated, the nose 262 and cowl 260 are cylindrical. The driving portion 264 is also cylindrical and the cowl 260 and driving portion 264 closely adjoin the outer circumferential surface of the nose 262. The driving portion 264 is internal to the body 74. The cowl 260 protrudes outward to different extents, depending upon the position of the shading screen 153. The driving portion 264 has a groove 266 that receives a cam 268 of a drive cylinder 270. The drive cylinder 270 surrounds the driving portion 264 and is trapped between the camera frame 78 and front cover 80. The drive cylinder 270 has a knob 272 that protrudes through a crescent shaped opening 274 in the front cover 80. When the knob 272 is pivoted within the opening 274 by the user, the cam 268 applies force to the driving portion 264, moving the driving portion 264 linearly out of the camera.

The screener 153 can be modified to move in other ways. For example, reciprocal screw threads (not shown) can be used to allow rotation and axial movement of the shading screen 154 relative to the body 74. Similarly, the screener 153 can have a support structure 155 in the form of a simple tube that slides in and out on a nose 262 or other part of the body 74.

In particular embodiments, the photofinishing unit is a kiosk or other photofinishing unit having a user display. In this case, the photofinishing unit can manually or automatically detect filter effects or encodement patterns or both after a film unit is digitized. Manual detection can be limited to selected digital images. When a filter effect or encodement pattern is detected, the photofinishing unit can display the preassigned digital modification or all digital modifications of a set including the preassigned digital modification. In the latter case, the preassigned digital modification can be highlighted or otherwise identified to the user. The photofinishing unit can then accept user input through preset buttons or the like accepting or rejecting the application of a preassigned digital modification and, optionally, designating one of the other modifications.

The invention has been described in detail with particular reference to certain preferred embodiments thereof, but it will be understood that variations and modifications can be effected within the spirit and scope of the invention.

What is claimed is:

1. A photography method comprising the steps of:
   determining that a set of captured images includes an encoded captured image having a partial shading encodement, said partial shading encodement having a predetermined edge pattern, said partial shading encodement being disposed within a predetermined subarea of said image;
   digitizing said encoded captured image to provide a digital image having a plurality of pixels;
   convolving a plurality of pixel templates of said edge pattern and said pixels in said subarea of said digital image, to provide a plurality of template position metrics, each said pixel template having the same shape, each said pixel template being differently located in said subarea;
   comparing the highest of said template position metrics and a predetermined threshold template position metric value of said edge pattern.

2. The method of claim 1 further comprising digitally modifying said digital image with a preselected digital modification when said highest said template position metric matches said threshold template position metric value.

3. The method of claim 2 further comprising printing a final image from said digital image following said digitally modifying.

4. The method of claim 2 further comprising retaining said digital image as a representational image when said highest said template position metric fails to match said threshold template position metric value.

5. The method of claim 2 wherein said digital modification is changing said digital image from color to monochrome.

6. The method of claim 1 wherein said pixel templates are rotated relative to each other.

7. The method of claim 1 further comprising the steps of:
detecting a filter effect in said subarea, when said highest said template position metric matches said threshold template position metric value; and
digitally modifying said digital image with a digital modification preassigned to said filter effect, in association with said edge pattern.

8. The method of claim 7 wherein said said detecting further comprises automatically analyzing color values of at least some of said pixels of said subarea.

9. The method of claim 8 wherein said analyzing further comprises the steps of:
transforming said digital image into a luminance-chrominance representation having at least one luminance pixel value and at least two chrominance pixel values for each said pixel;
calculating a predictive chrominance parameter from said chrominance pixel values; and
comparing said predictive chrominance parameter to a reference chrominance parameter of a predetermined filter effect.

10. The method of claim 9 wherein said reference chrominance parameter is the arithmetic mean of said chrominance pixel values.

11. The method of claim 9 wherein said reference chrominance parameter is the arithmetic mean of chrominance pixel values of ones of said image pixels having brightest luminance pixel values.

12. The method of claim 9 wherein said comparing is of said predictive chrominance parameter and first and second said predictive chrominance parameters:
said first predictive chrominance parameter being calculated as the arithmetic mean of said chrominance pixel values, and
said second predictive chrominance parameter being calculated as the arithmetic mean of said chrominance pixel values corresponding to ones of said image pixels having brightest luminance pixel values.

13. The method of claim 7 wherein said analyzing further comprises comparing color positions of a sampling of said pixels to a reference color position of said color cast; and denoting said digital image as having said filter effect when said pixels of said sampling match said reference color position.

14. The method of claim 13 wherein said color values of each said pixel are separate RGB pixel values and said comparing further comprises correlating each of said RGB pixel values to a predetermined RGB reference value.

15. The method of claim 7 wherein said detecting further comprises displaying said digital image to an operator and accepting operator input designating said filter effect.

16. The method of claim 1 wherein said determining further comprises reading an identifier.

17. The method of claim 16 wherein said identifier is a cartridge ID.

18. A photography method comprising the steps of:
determining that a set of captured images includes one or more images having any one of a set of predetermined partial shading encodements, said partial shading encodements each having a predetermined edge pattern, said partial shading encodements being disposed within a predetermined subarea of said image;
digitizing said captured images to provide a digital image having a plurality of pixels;
convolving a plurality of pixel templates of said edge pattern of a first of said partial shading encodements and said pixels in said subarea of a first of said digital images, to provide a plurality of template position metrics, each said pixel template having the same shape, each said pixel template being differently located in said subarea;
comparing the highest of said template position metrics and a predetermined threshold template position metric value of said edge pattern.

19. The method of claim 18 further comprising repeating said convolving and comparing steps with another of said partial shading encodements in place of said first of said partial shading encodements.

20. The method of claim 19 further comprising continuing said repeating until said highest template position metric of one of said comparing steps matches a respective said threshold template position metric value.

21. The method of claim 20 further comprising, when said highest template position metric matches the respective said threshold template position metric value, digitally modifying said digital image with a digital modification preassigned to the respective said partial shading encodement.

22. The method of claim 21 further comprising printing a final image from said digital image following said digitally modifying.

23. The method of claim 21 further comprising retaining said digital image as a representational image when all of said highest template position metrics fail to match respective said threshold template position metric values.

24. The method of claim 23 further comprising repeating said convolving, comparing, repeating, continuing, digitally modifying, and retaining steps as to the remainder of said captured images.

25. The method of claim 18 further comprising the steps of
displaying one or more of said digital images following said digitizing;
displaying indicia identifying one or more of said digital modifications;
accepting user input designating said first of said partial shading encodements and said first of said digital images.

26. The method of claim 25 further comprising, following said convolving and comparing, identifying said one of said digital modifications preassigned to said edge pattern.

27. A photofinishing unit comprising:
a digitizer digitizing a series of captured images on filmstrips of a group of film units to provide a series of digital images, said captured images including a plurality of shade-patterned light images, each said shade-patterned light image defining an encodement pattern;
a digital fulfillment engine receiving said digital images, said digital fulfillment engine including automatic digital processing of said digital images corresponding to said shade-patterned light images in accordance with a modification preassigned to the respective said encodement pattern.

28. The photofinishing unit of claim 27 wherein each said digital image has a plurality of pixels, and said digital processing further comprises the steps of:
convolving a pixel template of one or more sets of pixel templates and said pixels in a subarea of said digital image to provide one or more sets of template position metrics, said sets of pixel templates each being associated with a respective edge pattern, each said pixel template in a respective said set having the same shape, each said pixel template in a respective said set being differently located in said subarea;

comparing the highest of said template position metrics of each of said sets and a predetermined threshold template position metric value of the respective said edge pattern; and digitally modifying the respective said digital image with a digital modification when said highest template position metric matches the respective said threshold template position metric value, said digital modification being preassigned to the respective edge pattern.

29. A photography system comprising:

a plurality of cameras, each said camera including:
  a body;
  a film holder having an exposure frame surrounding an exposure opening;
  a taking lens system mounted to said body, said taking lens system having an optical axis, said taking lens system transmitting a scene image through said exposure opening;
  a shading screen partially shading said exposure frame in a use position; and
  a film unit removably disposed in said film holder, said film unit having a plurality of archival images, at least one of said archival images having an encodement pattern responsive to said shading; and a photofinishing unit including:

a digitizer digitizing said filmstrips to provide a sequence of digital images from said archival images, and transmitting said digital images;

a digital fulfillment engine receiving said digital images, said digital fulfillment engine including automatic digital processing of said digital images to determine the presence of said encodement pattern and to alter said light images having said encodement pattern in accordance with a modification preassigned to said encodement pattern.

30. The system of claim 29 wherein each said digital image has a plurality of pixels, and said digital processing further comprises the steps of:

convolving a pixel template of one or more sets of pixel templates and said pixels in a subarea of said digital image to provide one or more sets of template position metrics, said sets of pixel templates each being associated with a respective edge pattern, each said pixel template in a respective said set having the same shape, each said pixel template in a respective said set being differently located in said subarea;

comparing the highest of said template position metrics of each of said sets and a predetermined threshold template position metric value of the respective said edge pattern; and digitally modifying the respective said digital image with a digital modification when said highest template position metric matches the respective said threshold template position metric value, said digital modification being preassigned to the respective edge pattern.

* * * * *